(12) United States Patent
Kobayashi et al.

(10) Patent No.: US 9,613,592 B2
(45) Date of Patent: *Apr. 4, 2017

(54) HEAD MOUNTED DISPLAY DEVICE AND CONTROL METHOD FOR HEAD MOUNTED DISPLAY DEVICE

(71) Applicant: Seiko Epson Corporation, Tokyo (JP)

(72) Inventors: Shinichi Kobayashi, Azumino (JP); Toshikazu Uchiyama, Chino (JP); Hitomi Wakamiya, Matsumoto (JP); Masahide Takano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,584

(22) Filed: May 4, 2016

(65) Prior Publication Data

US 2016/0322026 A1 Nov. 3, 2016

Related U.S. Application Data

(63) Continuation of application No. 14/323,598, filed on Jul. 3, 2014, now Pat. No. 9,360,672.

(30) Foreign Application Priority Data

Jul. 11, 2013 (JP) .................. 2013-145642
Mar. 17, 2014 (JP) .................. 2014-053189

(51) Int. Cl.
*G09G 5/10* (2006.01)
*G06F 3/01* (2006.01)
(Continued)

(52) U.S. Cl.
CPC ............ *G09G 5/10* (2013.01); *G02B 27/017* (2013.01); *G06F 3/013* (2013.01);
(Continued)

(58) Field of Classification Search
CPC .......... G06F 3/005; G06F 3/013; G06F 3/017; G06F 3/0304
See application file for complete search history.

(56) References Cited

U.S. PATENT DOCUMENTS

2008/0151193 A1* 6/2008 Reder ................ H04N 13/0431
353/7
2009/0273687 A1 11/2009 Tsukizawa
(Continued)

FOREIGN PATENT DOCUMENTS

JP 2010-141548 A 6/2010

OTHER PUBLICATIONS

Ministry of Internal Affairs and Communications, "Report on Government-funded Research and Study Regarding the Effects of Content on a Living Body," Mar. 2004, pp. 1-3.
(Continued)

*Primary Examiner* — Md Saiful A Siddiqui
(74) *Attorney, Agent, or Firm* — ALG Intellectual Property, LLC

(57) ABSTRACT

A transmission type head mounted display device includes an image display unit including an image-light generating unit configured to generate image light on the basis of image data and emit the image light, the image display unit causing a user to visually recognize the image light as a virtual image and transmitting an outside scene in a state in which the image display unit is worn on the head of the user, and a control unit configured to set, as the image light that the control unit causes the user to visually recognize using the image display unit, specific image light generated on the basis of set specific image data and changing according to elapse of time.

8 Claims, 21 Drawing Sheets

(51) Int. Cl.
  *G02B 27/01* (2006.01)
  *G06F 3/0354* (2013.01)
  *G06T 19/00* (2011.01)
(52) U.S. Cl.
  CPC ........ *G06F 3/03547* (2013.01); *G06T 19/006* (2013.01); *G02B 2027/014* (2013.01); *G02B 2027/0118* (2013.01); *G09G 2320/066* (2013.01); *G09G 2354/00* (2013.01)

(56) References Cited

U.S. PATENT DOCUMENTS

| | | | | |
|---|---|---|---|---|
| 2009/0278766 | A1* | 11/2009 | Sako | .................... G02B 27/017 345/8 |
| 2012/0113099 | A1 | 5/2012 | Kim | |
| 2012/0206816 | A1* | 8/2012 | Yoshida | ............. G02B 27/0172 359/630 |
| 2012/0242560 | A1 | 9/2012 | Nakada | |
| 2013/0010297 | A1 | 1/2013 | Wang | |
| 2013/0114043 | A1 | 5/2013 | Balan | |
| 2013/0141472 | A1 | 6/2013 | Tan | |
| 2013/0242056 | A1 | 9/2013 | Fleck | |
| 2014/0327750 | A1* | 11/2014 | Malachowsky | ........ H04N 5/232 348/61 |

OTHER PUBLICATIONS

NHK & the Japan Commercial Broadcasters Association, "Guideline regarding Video Effect Techniques used in Animation and the Like," Apr. 1, 2006, pp. 1-3.

Non-Final Office Action received in U.S. Appl. No. 14/323,598, Sep. 10, 2015.

Notice of Allowance and Notice of Allowability received in U.S. Appl. No. 14/323,598, Feb. 12, 2016.

* cited by examiner

HEAD MOUNTED DISPLAY DEVICE AND CONTROL METHOD FOR HEAD MOUNTED DISPLAY DEVICE

The present application is a continuation application of U.S. patent application Ser. No. 14/323,598 filed Jul. 3, 2014, which claims priority to Japanese Patent Application No. 2013-145642 filed Jul. 11, 2013 and Japanese Patent Application No. 2014-053189 filed Mar. 17, 2014, which are expressly incorporated by reference herein.

BACKGROUND

1. Technical Field

The present invention relates to a head mounted display device.

2. Related Art

A head mounted display device (a head mounted display; HMD), which is a display device mounted on the head, is known. For example, the head mounted display device generates, using a liquid crystal display and a light source, image light representing an image and guides the generated image light to the eyes of a user using a projection optical system and a light guide plate to thereby cause the user to visually recognize a virtual image. As the head mounted display device, there are two types: a transmission type for enabling the user to visually recognize an outside scene in addition to the virtual image and a non-transmission type for disabling the user from visually recognizing the outside scene. As the transmission type head mounted display device, there are an optical transmission type and a video transmission type.

JP-A-2010-141548 (Patent Literature 1) discloses an image display device that classifies a plurality of frames, which form a received video signal, respectively into several types according to luminance and chroma and, when changes from a specific type of frames to the other types of frames occur a fixed number of times or more in a predetermined number of frames, deletes several frames from the predetermined number of frames to reduce the changes of the types of the frames to thereby reduce the burden on a user who visually recognizes a video.

The related art is also disclosed in "Research Report concerning the Influence of Contents on the Living Organism, March 2004, Ministry of Internal Affairs and Communications" (Non Patent Literature 1) and "Guideline by Video Method such as Animation, 2006, Japan Broadcasting Corporation, National Association of Commercial Broadcasters in Japan" (Non Patent Literature 2).

However, in the technique described in Patent Literature 1, the types of the respective plurality of frames, which form the received video signal, are identified and the changes from a specific type of frames to the other types of frames are reduced. Therefore, a certain effect is obtained concerning only a video visually recognized by the user. However, for example, it is not taken into account to cause the user to visually recognize a still image without a change in types of frames. Therefore, it is desired to reduce the burden on the user concerning the still image and the like other than the video. In the transmission type head mounted display device, a transmitted outside scene is superimposed on a received video to cause the user to visually recognize the outside scene in addition to the video. Therefore, it is desired to control, taking into account the transmitted outside scene, a virtual image that the user is caused to visually recognize. It is also desired to control, according to detected information included in the transmitted outside scene, the virtual image that the user is caused to visually recognize. Besides, in the head mounted display device in the past, improvement of convenience and the like are desired.

SUMMARY

An advantage of some aspects of the invention is to solve at least a part of the problems described above, and the invention can be implemented as the following aspects.

(1) An aspect of the invention provides a transmission type head mounted display device. The head mounted display device includes: an image display unit including an image-light generating unit configured to generate image light on the basis of image data and emit the image light, the image display unit causing a user to visually recognize the image light as a virtual image and transmitting an outside scene in a state in which the image display unit is worn on the head of the user; and a control unit configured to set, as the image light that the control unit causes the user to visually recognize using the image display unit, specific image light generated on the basis of set specific image data and changing according to elapse of time. With the head mounted display device according to this aspect, since the image light visually recognized by the user gently changes according to the elapse of time, the burden on the visual sense of the user is reduced.

(2) The head mounted display device according to the aspect described above may be configured such that the specific image data is set on the basis of specific information, the specific image light includes a plurality of kinds of first image light and second image light different from the plurality of kinds of first image light, and the control unit changes the image light, which the control unit causes the user to visually recognize using the image display unit, from the plurality of kinds of first image light to the second image light according to the elapse of time. The head mounted display device according to this aspect causes the user to visually recognize the second image light after causing the user to visually recognize the plurality of kinds of first image light according to the elapse of time rather than causing the user to suddenly visually recognize the second image light in a state in which only the outside scene is visually recognized. Therefore, since changes of the outside scene and the image light visually recognized by the user are gentle, it is possible to further reduce the burden on the visual sense of the user.

(3) The head mounted display device according to the aspect described above may be configured such that each of the plurality of kinds of first image light and the second image light have different luminances. With the head mounted display device according to this aspect, it is possible to generate the plurality of kinds of first image light and the second image light on the basis of one image data simply by controlling the luminances. Therefore, it is possible to reduce the burden on the visual sense of the user with simple control.

(4) The head mounted display device according to the aspect described above may be configured such that the image-light generating unit is configured by an image modulation element capable of adjusting an amount of light to be emitted, and the control unit adjusts the luminances of each of the plurality of kinds of first image light and the second image light to be different by adjusting the amount of light emitted from the image modulation element. With the head mounted display device according to this aspect, it is possible to generate the plurality of kinds of first image light and the second image light on the basis of one image data simply by controlling the luminances. Therefore, it is possible to reduce the burden on the visual sense of the user with simple control.

(5) The head mounted display device according to the aspect described above may be configured such that the image-light generating unit includes a light source capable of adjusting an amount of light to be emitted and an image formation panel configured to convert the light emitted from the light source into the image light, and the control unit adjusts the luminances of each of the plurality of kinds of first image light and the second image light to be different by adjusting the amount of the light emitted from the light source. With the head mounted display device according to this aspect, it is possible to generate the plurality of kinds of first image light and the second image light on the basis of one image data simply by controlling the luminances. Therefore, it is possible to reduce the burden on the visual sense of the user with simple control.

(6) The head mounted display device according to the aspect described above may be configured such that the luminance of the second image light is larger than the luminance of each of the plurality of kinds of first image light, and the control unit causes, using the image display unit, when the control unit changes a state in which the control unit does not cause the user to visually recognize the plurality of kinds of first image light or the second image light to a state in which the control unit causes the user to visually recognize the second image light after causing the user to visually recognize the plurality of kinds of first image light, the user to visually recognize the plurality of kinds of first image light as if the luminance of the plurality of kinds of first image light increases according to the elapse of time and causes, when the control unit changes a state in which the control unit causes the user to visually recognize the plurality of kinds of first image light after causing the user to visually recognize the second image light to the state in which the control unit does not cause the user to visually recognize the plurality of kinds of first image light or the second image light, the user to visually recognize the plurality of kinds of first image light as if the luminance decreases according to the elapse of time. With the head mounted display device according to this aspect, it is possible to cause the user to visually recognize the plurality of kinds of first image light and the second image light as if the second image light gradually emerges through the plurality of kinds of first image light. It is possible to further reduce the burden on the visual sense sight of the user.

(7) The head mounted display device according to the aspect described above may be configured such that the control unit causes, using the image display unit, when the control unit changes the state in which the control unit does not cause the user to visually recognize the plurality of kinds of first image light or the second image light to the state in which the control unit causes the user to visually recognize the second image light after causing the user to visually recognize the plurality of kinds of first image light, the user to visually recognize the plurality of kinds of first image light as if an increase ratio of the luminance of the plurality of kinds of first image light increases according to the elapse of time and causes, when the control unit changes the state in which the control unit causes the user to visually recognize the plurality of kinds of first image light after causing the user to visually recognize the second light to the state in which the control unit does not cause the user to visually recognize the plurality of kinds of first image light or the second image light, the user to visually recognize the plurality of kinds of first image light as if a decrease ratio of the luminance increases according to the elapse of time. With the head mounted display device according to this aspect, it is possible to cause the user to visually recognize the plurality of kinds of first image light and the second image light as if the second image light gradually emerges through the plurality of kinds of first image light. It is possible to further reduce the burden on the visual sight of the user.

(8) The head mounted display device according to the aspect described above may be configured such that the head mounted display device further includes a pupil specifying unit configured to specify the size of the pupils of the user, and the control unit sets the luminances of each of the plurality of kinds of first image light and the second image light such that luminance at the time when the specified size of the pupils is a second size larger than a first size is smaller than luminance at the time when the specified size of the pupils is the first size. With the head mounted display device according to this aspect, when the size of the pupils of the eyes of the user is large, that is, brightness around the user is low, control for reducing the luminances of the plurality of kinds of first image light and the second image light is performed. When the brightness around the user is high, control for increasing the luminances of the plurality of kinds of first image light and the second image light is performed. Therefore, the luminances of the plurality of kinds of first image light and the second image light are controlled according to the brightness around the user. Therefore, it is possible to reduce the visual burden on the user without causing the user to visually recognize image light with luminance higher than necessary. Further, it is possible to cause the user to visually recognize image light having brightness enough for the user to visually recognize the image light.

(9) The head mounted display device according to the aspect described above may be configured such that the head mounted display device further includes a pupil specifying unit configured to specify the size of the pupils of the user, and the control unit sets time for changing the plurality of kinds of first image light to the second image light longer as the specified size of the pupils is larger when the control unit changes a state in which the specific image light is not visually recognized by the user to a state in which the specific image light is visually recognized by the user. With the head mounted display device according to this aspect, when the size of the pupils of the eyes of the user is large, that is, brightness around the user is low, in order to prevent the visual burden on the user from increasing when the control unit causes the user to visually recognize the plurality of kinds of first image light and the second image light, the time for changing the plurality of kinds of first image light to the second image light is set long. Therefore, it is possible to reduce the visual burden on the user.

(10) The head mounted display device according to the aspect described above may be configured such that each of the plurality of kinds of first image light is a part of the second image light, and the control unit causes, using the image display unit, when the control unit changes a state in which the control unit does not cause the user to visually recognize the plurality of kinds of first image light or the second image light to a state in which the control unit causes the user to visually recognize the second image light after causing the user to visually recognize the plurality of kinds of first image light, the user to visually recognize the plurality of kinds of first image light as if the size of the plurality of kinds of first image light increases according to the elapse of time and causes, when the control unit changes a state in which the control unit causes the user to visually recognize the plurality of kinds of first image light after causing the user to visually recognize the second image light to the state in which the control unit does not cause the user to visually recognize the plurality of kinds of first image light or the second image light, the user to visually recognize the plurality of kinds of first image light as if the size of the plurality of kinds of first image light decreases according to the elapse of time. The head mounted display device according to this aspect increases a region of an image to be visually recognized according to the elapse of time rather than causing the user to suddenly visually recognize the second image light in a state in which only the outside scene is visually recognized. Therefore, since changes of the outside scene and the image visually recognized by the user are gentle, the burden on the visual sense of the user is reduced.

(11) The head mounted display device according to the aspect described above may be configured such that the head mounted display device further includes a temperature detecting unit configured to detect a temperature distribution of the outside scene in a visual line direction of the user, and the specific information includes information for specifying the detected temperature distribution of the outside scene. With the head mounted display device according to this aspect, it is possible to cause the user to visually recognize an image involved in a temperature change of the outside scene. Therefore, convenience for the user is improved.

(12) The head mounted display device according to the aspect described above may be configured such that the head mounted display device further includes: an image pickup unit configured to pick up an image of the outside scene in a visual line direction of the user; and a target extracting unit configured to extract a specific target included in the picked-up image, and the specific information is information concerning the extracted specific target. With the head mounted display device according to this aspect, it is possible to control, according to a detection result of the specific target included in the picked-up image, an image that the user is caused to visually recognize. Therefore, convenience for the user is improved.

(13) The head mounted display device according to the aspect described above may be configured such that the target extracting unit specifies speed of a movement of the specific target in an image pickup range of the image pickup unit, and the control unit sets time for changing the plurality of kinds of first image light to the second image light longer as the specified speed of the movement of the specific target is higher. With the head mounted display device according to this aspect, when the speed of the movement of the specific target is high, the time for changing the plurality of kinds of first image light to the second image light is set long. Therefore, it is possible to reduce the visual burden on the user by reducing a visual change to the user.

(14) The head mounted display device according to the aspect described above may be configured such that the target extracting unit specifies speed of a movement of the specific target in an image pickup range of the image pickup unit, and, when the specified speed of the specific target is equal to or higher than a set first threshold, the control unit sets, as the image light that the control unit causes the user to visually recognize using the image display unit, pre-display image light generated on the basis of image data different from the specific image light before setting the specific image light. Even when the specific target is included in the image pickup range, when the speed of the movement of the specific target is high, the head mounted display device according to this aspect causes the user to visually recognize the plurality of kinds of first image light in a preparation stage before causing the user to visually recognize the second image light. Therefore, it is possible to reduce a change in the outside scene visually recognized by the user and reduce the visual burden on the user.

(15) The head mounted display device according to the aspect described above may be configured such that the head mounted display device further includes a distance specifying unit configured to specify a distance between the specific target and the image display unit, and the control unit sets the specific image light when the specified distance is equal to or smaller than a set second threshold. With the head mounted display device according to this aspect, an image of the specific target is picked up and, in addition, only when the distance between the user and the specific target is equal to or smaller than a fixed distance, the plurality of kinds of first image light and the second image light are visually recognized by the user. Therefore, when the specific target is not present in a position close to the user, the second image light based on information unnecessary for the user is not visually recognized by the user. Therefore, convenience for the user is improved.

(16) The head mounted display device according to the aspect described above may be configured such that the specific information is information concerning an operation that the user should perform for the specific target. With the head mounted display device according to this aspect, the user can perform the operation safely and in a correct procedure. Therefore, convenience for the user is improved.

(17) In the head mounted display device according to this aspect, the head mounted display device may further include a position-information acquiring unit configured to acquire position information for specifying a position of the user, and the specific information may include the acquired position information. With the head mounted display device according to this aspect, it is possible to control an image, which the user is caused to visually recognize, on the basis of the position information of the user. Therefore, convenience for the user is improved.

(18) The head mounted display device according to the aspect described above may be configured such that the head mounted display device further includes a visual-line-direction specifying unit configured to acquire visual line direction information, which is information for specifying a visual line direction of the user, and the specific information includes the visual line direction information. With the head mounted display device according to this aspect, when the visual line direction of the user is not fixed, the user is not caused to visually recognize the plurality of kinds of first image light or the second image light. Therefore, even if the user changes the visual line direction, the transmitted outside scene only changes. The user does not have to visually recognize a generated image. Therefore, there is little change in the outside scene visually recognized by the user. The burden on the visual sense of the user is further reduced.

(19) The head mounted display device according to the aspect described above may be configured such that the head mounted display device further includes a movement specifying unit configured to specify speed of a movement of the user, and the control unit sets time for changing the plurality of kinds of first image light to the second image light longer as the specified speed of the movement of the specific target is higher. With the head mounted display device according to this aspect, when the speed of the movement of the user is high, the control unit sets the time for changing the plurality of kinds of first image light to the second image light long. Consequently, when the movement of the user is fast, a ratio of a change of the plurality of kinds of first image light visually recognized by the user is small. Therefore, it is possible to reduce the visual burden on the user.

Not all of a plurality of components of the aspects of the invention explained above are essential. To solve a part or all of the problems or to attain a part or all of the effects described in this specification, concerning a part of the plurality of components, it is possible to perform, as appropriate, change, deletion, replacement with new other components, and deletion of a part of limited contents. To solve a part or all of the problems or to attain a part or all of the effects described in this specification, it is also possible to combine a part or all of technical features included in one aspect of the invention with a part or all of technical features included in the other aspects of the invention to form independent one aspect of the invention.

For example, one aspect of the invention can be realized as a device including at least one or more or all of the image display unit and the control unit. That is, the device may include or may not include the image display unit. The device may include or may not include the control unit. The image display unit may include, for example, an image-light generating unit configured to generate image light on the basis of image data and emit the image light. The image display unit may cause a user to visually recognize the image light as a virtual image and transmit an outside scene in a state in which the image display unit is worn on the head of the user. The control unit may set, as the image light that the control unit causes the user to visually recognize using the image display unit, specific image light generated on the basis of set specific image data and changing according to elapse of time. The device can be realized as, for example, a head mounted display device and can also be realized as devices other than the head mounted display device. According to such an aspect, it is possible to attain at least one of various objects such as improvement of operability and simplification of the device, integration of the device, and improvement of convenience for the user who uses the device. A part or all of the technical features of the aspects of the head mounted display device explained above can be applied to the device.

The invention can be realized in various forms other than the head mounted display device. The invention can be realized in forms such as a display device, a control method for the head mounted display device and the display device, a head mounted display system, a computer program for realizing functions of the head mounted display system, the display device, and a recording medium having recorded therein the computer program, and a data signal including the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained in order described below.

A. First Embodiment

A-1. Configuration of a head mounted display device
A-2. Specific image display processing
A-3. Specific image non-display processing
B. Second Embodiment
C. Third Embodiment
D. Modifications

A-1. Configuration of a Head Mounted Display Device

Figure 1:
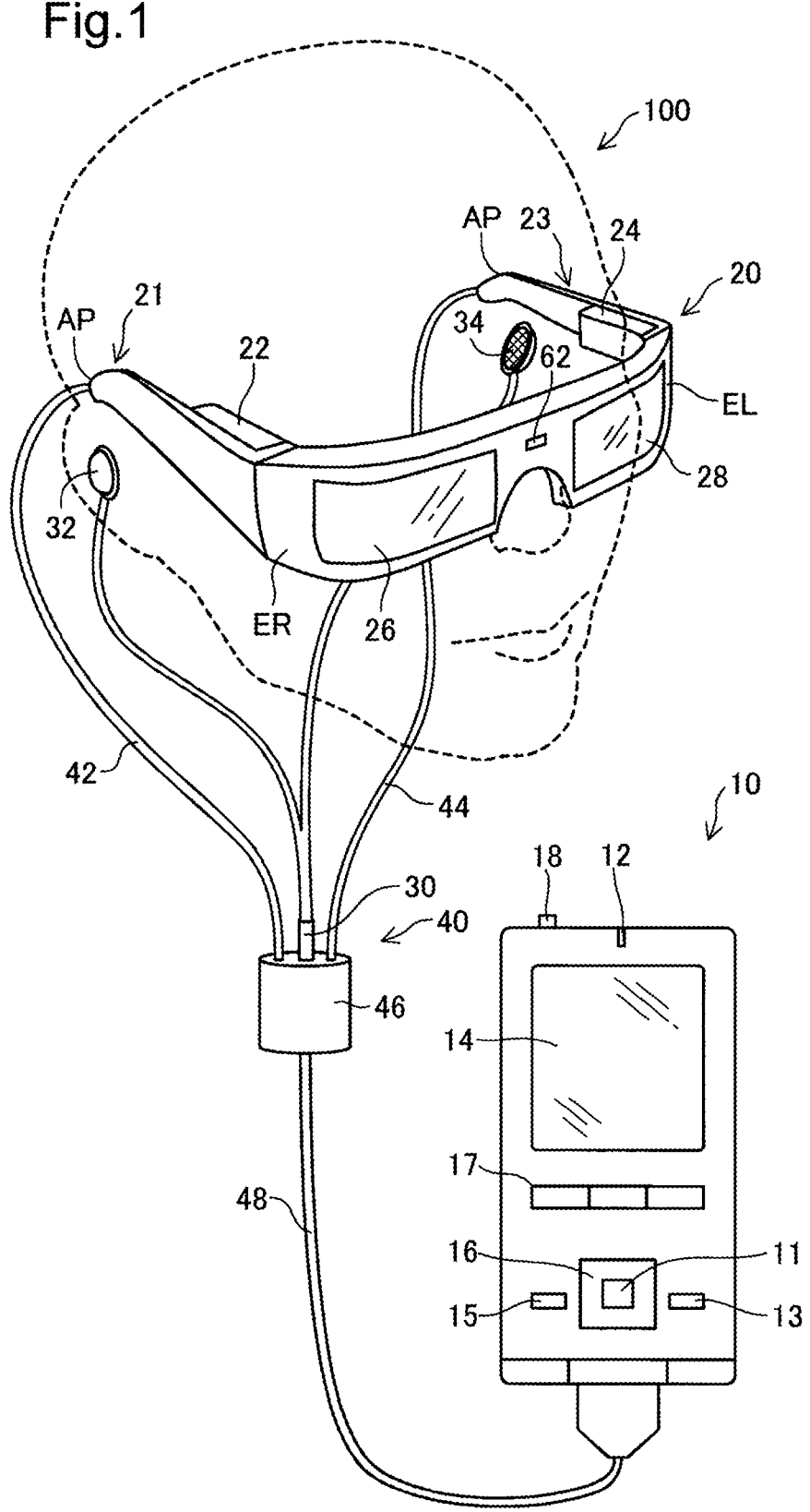
FIG. 1 is an explanatory diagram showing the external configuration of a head mounted display device.

FIG. 1 is an explanatory diagram showing the external configuration of a head mounted display device 100. The head mounted display device 100 is a display device mounted on the head and is also called head mounted display (HMD). The head mounted display device 100 in this embodiment is a optical transmission type head mounted display device for enabling a user to visually recognize a virtual image and, at the same time, directly visually recognize an outside scene. In this specification, the virtual image visually recognized by the user using the head mounted display device 100 is also referred to as "displayed image" for convenience. Emitting image light generated on the basis of image data is referred to as "display an image".

The head mounted display device 100 includes an image display unit 20 configured to cause a user to visually recognize a virtual image in a state in which the image display unit 20 is worn on the head of the user and a control unit 10 (a controller 10) configured to control the image display unit 20.

The image display unit 20 is a wearing body worn on the head of the user and has an eyeglass shape in this embodiment. The image display unit 20 includes a right holding unit 21, a right display driving unit 22, a left holding unit 23, a left display driving unit 24, a right optical-image display unit 26, a left optical-image display unit 28, and a thermography 62. The right optical-image display unit 26 and the left optical-image display unit 28 are respectively arranged to be located in front of the right and left eyes of the user when the user wears the image display unit 20. One end of the right optical-image display unit 26 and one end of the left optical-image display unit 28 are connected to each other in a position corresponding to the middle of the forehead of the user when the user wears the image display unit 20.

The right holding unit 21 is a member provided to extend from an end ER, which is the other end of the right optical-image display unit 26, to a position corresponding to the temporal region of the user when the user wears the image display unit 20. Similarly, the left holding unit 23 is a member provided to extend from an end EL, which is the other end of the left optical-image display unit 28, to a position corresponding to the temporal region of the user when the user wears the image display unit 20. The right holding unit 21 and the left holding unit 23 hold the image display unit 20 on the head of the user in the same manner as temples of eyeglasses.

The right display driving unit 22 and the left display driving unit 24 are arranged on sides opposed to the head of the user when the user wears the image display unit 20. In the following explanation, the right holding unit 21 and the left holding unit 23 are generally simply referred to as "holding unit" as well. The right display driving unit 22 and the left display driving unit 24 are generally simply referred to as "display driving unit" as well. The right optical-image display unit 26 and the left optical-image display unit 28 are generally simply referred to as "optical-image display unit" as well.

The display driving units 22 and 24 include liquid crystal displays 241 and 242 (hereinafter referred to as "LCDs 241 and 242") and projection optical systems 251 and 252 (see FIG. 3). Details of the configuration of the display driving units 22 and 24 are explained below. The optical-image display units 26 and 28 functioning as optical members include light guide plates 261 and 262 (see FIG. 2) and dimming plates. The light guide plates 261 and 262 are formed of a light transmissive resin material or the like and guide image lights output from the display driving units 22 and 24 to the eyes of the user. The dimming plates are thin plate-like optical elements and arranged to cover the front side of the image display unit 20, which is a side opposite to the eye side of the user. The dimming plates protect the light guide plates 261 and 262 and suppress damage, adhesion of stain, and the like to the light guide plates 261 and 262. By adjusting the light transmittance of the dimming plates, it is possible to adjust an amount of external light entering the eyes of the user and adjust easiness of visual recognition of a virtual image. Note that the dimming plates can be omitted.

The thermography 62 is arranged in a position corresponding to the middle of the forehead of the user when the user wears the image display unit 20. The thermography 62 is an infrared thermography that detects an infrared ray radiated from an object and different depending on temperature, converts a detected infrared energy amount into temperature, and generates a temperature distribution image (an infrared heat image) representing a distribution of temperature. An angle of view of the thermography 62 is set such that a region of an image to be picked up is the same as a visual line of the user who wears the image display unit 20. The thermography 62 is equivalent to a temperature detecting unit in the appended claims.

The image display unit 20 further includes a connecting unit 40 for connecting the image display unit 20 to the control unit 10. The connecting unit 40 includes a main body cord 48 connected to the control unit 10, a right cord 42 and a left cord 44, which are two cords branching from the main body cord 48, and a coupling member 46 provided at a branching point. The right cord 42 and the left cord 44 are two cords branching from the main body cord 48. The right cord 42 is inserted into a housing of the right holding unit 21 from a distal end portion AP in an extending direction of the right holding unit 21 and connected to the right display driving unit 22. Similarly, the left cord 44 is inserted into a housing of the left holding unit 23 from a distal end portion AP in an extending direction of the left holding unit 23 and connected to the left display driving unit 24. The coupling member 46 is provided at a branching point of the main body cord 48 and the right and left cords 42 and 44. The coupling member 46 includes a jack for connecting an earphone plug 30. A right earphone 32 and a left earphone 34 extend from the earphone plug 30.

The image display unit 20 and the control unit 10 perform transmission of various signals via the connecting unit 40. Connectors (not shown in the figure), which fit with each other, are respectively provided at an end of the main body cord 48 on the opposite side of the coupling member 46 and in the control unit 10. The control unit 10 and the image display unit 20 are connected and disconnected according to fitting and unfitting of the connector of the main body cord 48 and the connector of the control unit 10. For example, a metal cable or an optical fiber can be adopted as the right cord 42, the left cord 44, and the main body cord 48.

The control unit 10 is a device for controlling the head mounted display device 100. The control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining content of operation by the control unit 10. The lighting unit 12 notifies, with a light emission state thereof, an operation state of the head mounted display device 100. As the operation state of the head mounted display device 100, for example, there are ON/OFF of a power supply. As the lighting unit 12, for example, an LED (Light Emitting Diode) is used. The display switching key 13 detects pressing operation and outputs, for example, a signal for switching a display mode of a content moving image to 3D and 2D. The track pad 14 detects operation by a finger of the user on an operation surface of the track pad 14 and outputs a signal corresponding to detected content. As the track pad 14, various track pads such as an electrostatic type, a pressure detection type, and an optical type can be adopted. The luminance switching key detects pressing operation and outputs a signal for increasing and decreasing the luminance of the image display unit 20. The direction key 16 detects pressing operation for keys corresponding to up, down, left, and right directions and outputs a signal corresponding to detected content. The power switch 18 detects slide operation of the switch to switch a state of a power supply of the head mounted display device 100.

Figure 2:
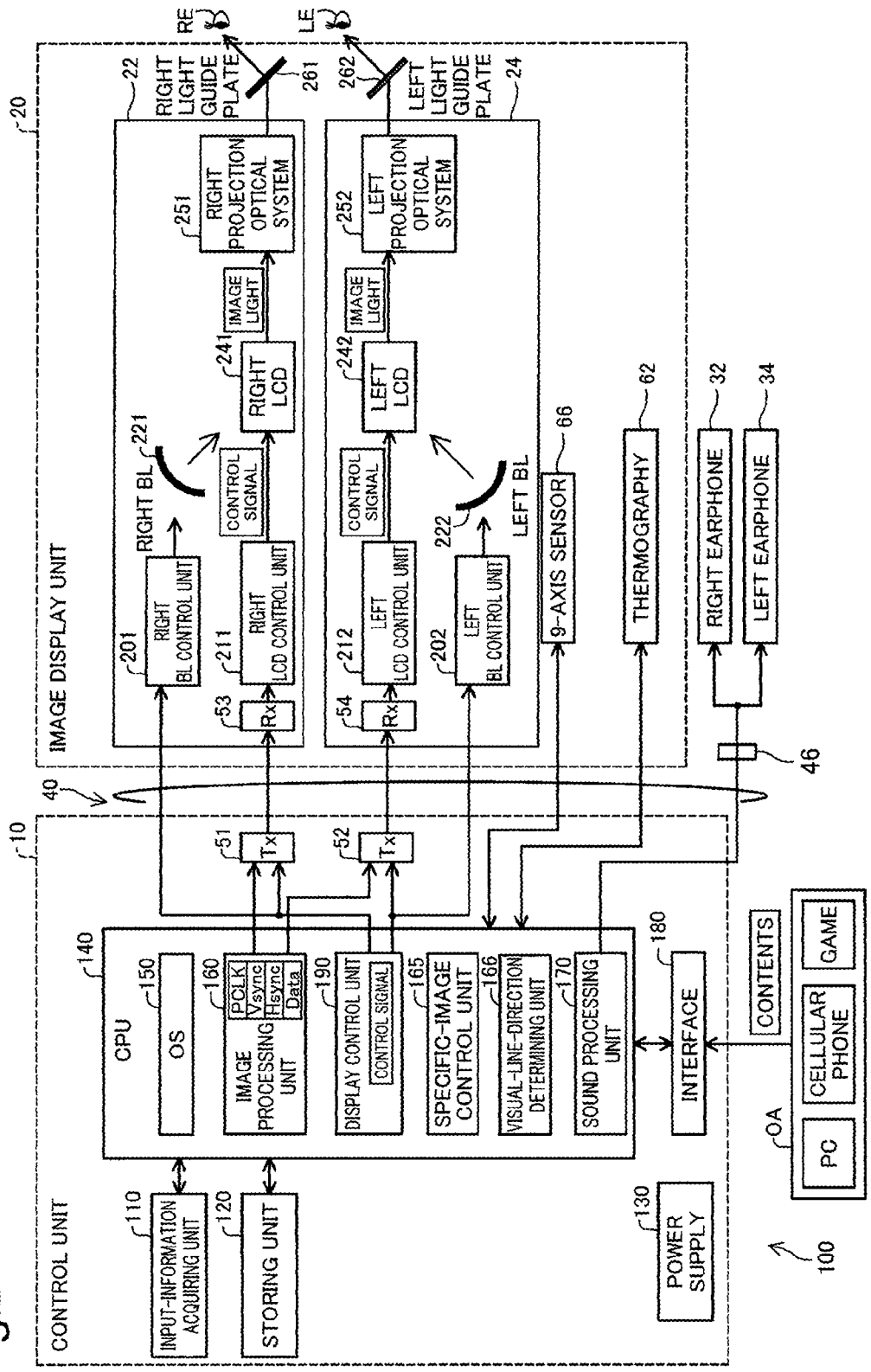
FIG. 2 is a block diagram schematically showing the configuration of the head mounted display device.

FIG. 2 is a block diagram functionally showing the configuration of the head mounted display device 100. As shown in FIG. 2, the control unit 10 includes an input-information acquiring unit 110, a storing unit 120, a power supply 130, an operation unit 135, a CPU 140, an interface 180, and transmitting units (Tx) 51 and 52. The operation unit 135 receives operation by the user. The operation unit 135 is configured by the determination key 11, the display switching key 13, the track pad 14, the luminance switching key 15, the direction key 16, the menu key 17, and the power switch 18.

The input-information acquiring unit 110 acquires a signal corresponding to an operation input by the user. As the signal corresponding to the operation input, for example, there are operation inputs to the track pad 14, the direction key 16, and the power switch 18 arranged on the operation unit 135. The power supply 130 supplies electric power to the units of the head mounted display device 100. As the power supply 130, for example, a secondary battery can be used. The storing unit 120 stores therein various computer programs. The storing unit 120 is configured by a ROM, a RAM, and the like. The CPU 140 reads out and executes the computer programs stored in the storing unit 120 to thereby function as an operating system 150 (OS 150), a display control unit 190, a sound processing unit 170, an image processing unit 160, a visual-line-direction determining unit 166, and a specific-image control unit 165.

The display control unit 190 generates control signals for controlling the right display driving unit 22 and the left display driving unit 24. Specifically, the display control unit 190 individually controls, using the control signals, ON/OFF of driving of the right LCD 241 by a right LCD control unit 211, ON/OFF of driving of a right backlight 221 by a right backlight control unit 201, ON/OFF of driving of the left LCD 242 by a left LCD control unit 212, and ON/OFF of driving of a left backlight 222 by a left backlight control unit 202. Consequently, the display control unit 190 controls generation and emission of image lights by the right display driving unit 22 and the left display driving unit 24. For example, the display control unit 190 causes both of the right display driving unit 22 and the left display driving unit 24 to generate image lights, causes one of the right display driving unit 22 and the left display driving unit 24 to generate image light, or causes both of the right display driving unit 22 and the left display driving unit 24 not to generate image light.

The display control unit 190 transmits control signals to the right LCD control unit 211 and the left LCD control unit 212 respectively via the transmitting units 51 and 52. The display control unit 190 transmits control signals respectively to the right backlight control unit 201 and the left backlight control unit 202.

The image processing unit 160 acquires an image signal included in contents. The image processing unit 160 separates synchronization signals such as a vertical synchronization signal VSync and a horizontal synchronization signal HSync from the acquired image signal. The image processing unit 160 generates a clock signal PCLK using a PLL (Phase Locked Loop) circuit or the like (not shown in the figure) according to cycles of the separated vertical synchronization signal VSync and horizontal synchronization signal HSync. The image processing unit 160 converts the analog image signal, from which the synchronization signals are separated, into a digital image signal using an A/D conversion circuit or the like (not shown in the figure). Thereafter, the image processing unit 160 stores the digital image signal after the conversion in a DRAM in the storing unit 120 frame by frame as image data (RGB data) of a target image. The image processing unit 160 may execute image processing such as resolution conversion processing, various kinds of tone correction processing for adjustment of luminance and chroma, and keystone correction processing on the image data.

The image processing unit 160 transmits the clock signal PCLK, the vertical synchronization signal VSync, and the horizontal synchronization signal HSync generated by the image processing unit 160 and the image data stored in the DRAM in the storing unit 120 respectively via the transmitting units 51 and 52. The image data transmitted via the transmitting unit 51 is referred to as "image data for right eye" as well. The image data transmitted via the transmitting unit 52 is referred to as "image data for left eye" as well. The transmitting units 51 and 52 function as a transceiver for serial transmission between the control unit 10 and the image display unit 20.

The sound processing unit 170 acquires a sound signal included in the contents, amplifies the acquired sound signal, and supplies the amplified sound signal to a speaker (not shown) in the right earphone 32 or a speaker (not shown) in the left earphone 34 connected to the coupling member 46. For example, when a Dolby (registered trademark) system is adopted, processing for the sound signal is performed. Different sounds, the frequencies or the like of which are varied, are respectively output from the right earphone 32 and the left earphone 34.

The visual-line-direction determining unit 166 estimates a visual line direction of the user on the basis of a direction and a movement of the image display unit 20 detected by a 9-axis sensor 66 explained below.

The specific-image control unit 165 is a high-heat detection application (hereinafter simply referred to as "heat detection application" as well) for displaying a portion having temperature equal to or higher than a threshold as a specific image. The specific-image control unit 165 identifies a region having temperature equal to or higher than the threshold on the basis of a temperature distribution image acquired by the thermography 62. The specific-image control unit 165 creates specific image data indicating a red image in a size same as the size of the identified region in order to cause the user to visually recognize that the temperature is equal to or higher than the threshold. The specific-image control unit 165 can create, on the basis of the specific image data, image data in which the color and the region in the specific image are changed. The specific-image control unit 165 transmits the created specific image data to the image processing unit 160 and the display control unit 190 as a control signal. The specific-image control unit 165 is equivalent to a control unit in the appended claims.

The interface 180 is an interface for connecting various external apparatuses OA, which are supply sources of contents, to the control unit 10. Examples of the external apparatuses OA include a personal computer PC, a cellular phone terminal, and a game terminal. As the interface 180, for example, a USB interface, a micro USB interface, or an interface for a memory card can be used.

The image display unit 20 includes the right display driving unit 22, the left display driving unit 24, the right light guide plate 261 functioning as the right optical-image display unit 26, the left light guide plate 262 functioning as the left optical-image display unit 28, the 9-axis sensor 66, and the thermography 62.

The 9-axis sensor 66 is a motion sensor configured to detect acceleration (three axes), angular velocity (three axes), and terrestrial magnetism (three axes). Since the 9-axis sensor 66 is provided in the image display unit 20, when the image display unit 20 is worn on the head of the user, the 9-axis sensor 66 detects a movement of the head of the user. A direction of the image display unit 20 is specified from the detected movement of the head of the user. The visual-line-direction determining unit 166 specifies a visual line direction of the user. When detected acceleration and angular velocity are equal to or lower than thresholds, the visual-line-direction determining unit 166 determines that the visual line direction of the user is fixed. The 9-axis sensor 66 and the visual-line-direction determining unit 166 are equivalent to a visual-line-direction specifying unit in the appended claims.

The right display driving unit 22 includes a receiving unit (Rx) 53, the right backlight control unit 201 (right BL control unit 201) and the right backlight 221 (right BL 221) functioning as a light source, the right LCD control unit 211 and the right LCD 241 functioning as a display element, and the right projection optical system 251. The right backlight control unit 201 and the right backlight 221 function as the light source. The right LCD control unit 211 and the right LCD 241 function as the display element. The right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is, for example, a light emitting body such as an LED or an electroluminescence (EL). The right LCD control unit 211 drives the right LCD 241 on the basis of the clock signal PCLK, the vertical synchronization signal VSync, the horizontal synchronization signal HSync, and the image data for right eye input via the receiving unit 53. The right LCD 241 is a transmissive liquid crystal panel on which a plurality of pixels are arranged in a matrix shape.

The right projection optical system 251 is configured by a collimate lens that changes the image light emitted from the right LCD 241 to light beams in a parallel state. The right light guide plate 261 functioning as the right optical-image display unit 26 guides the image light output from the right projection optical system 251 to a right eye RE of the user while reflecting the image light along a predetermined optical path. The right projection optical system 251 and the right light guide plate 261 are collectively referred to as "light guide unit" as well.

The left display driving unit 24 includes a configuration same as the configuration of the right display driving unit 22. The left display driving unit 24 includes a receiving unit 54 (Rx 54), the left backlight control unit 202 (left BL control unit 202) and the left backlight 222 (left BL 222) functioning as a light source, the left LCD control unit 212 and the left LCD 242 functioning as a display element, and the left projection optical system 252. The left backlight control unit 202 and the left backlight 222 function as the light source. The left LCD control unit 212 and the left LCD 242 function as the display element. The left backlight control unit 202, the left LCD control unit 212, the left backlight 222, and the left LCD 242 are collectively referred to as "image-light generating unit" as well. The left projection optical system 252 is configured by a collimate lens that changes the image light emitted from the left LCD 242 to light beams in a parallel state. The left light guide plate 262 functioning as the left optical-image display unit 28 guides the image light output from the left projection optical system 252 to a left eye LE of the user while reflecting the image light along a predetermined optical path. The left projection optical system 252 and the left light guide plate 262 are collectively referred to as "light guide unit" as well. The backlight control units 201 and 202 and the backlight 221 and 222 are equivalent to a light source in the appended claims. The LCD control units 211 and 212 and the LCDs 241 and 242 are equivalent to an image formation panel in the appended claims.

Figure 3:
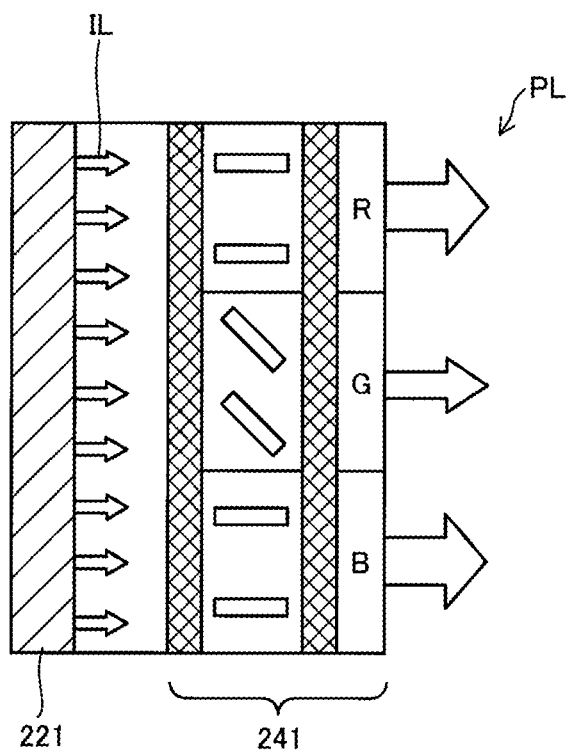
FIG. 3 is an explanatory diagram showing a state in which image light is emitted by an image-light generating unit.

FIG. 3 is an explanatory diagram showing a state in which image light is emitted by the image-light generating unit. The right LCD 241 drives liquid crystals in the positions of the pixels arranged in the matrix shape to thereby change the transmittance of light transmitted through the right LCD 241 to modulate illumination light IL irradiated from the right backlight 221 to effective image light PL representing an image. The same applies to the left side. Although the backlight system is adopted in this embodiment as shown in FIG. 3, the image light may be emitted using a front light system or a reflection system.

A-2. Specific Image Display Processing

Figure 4:
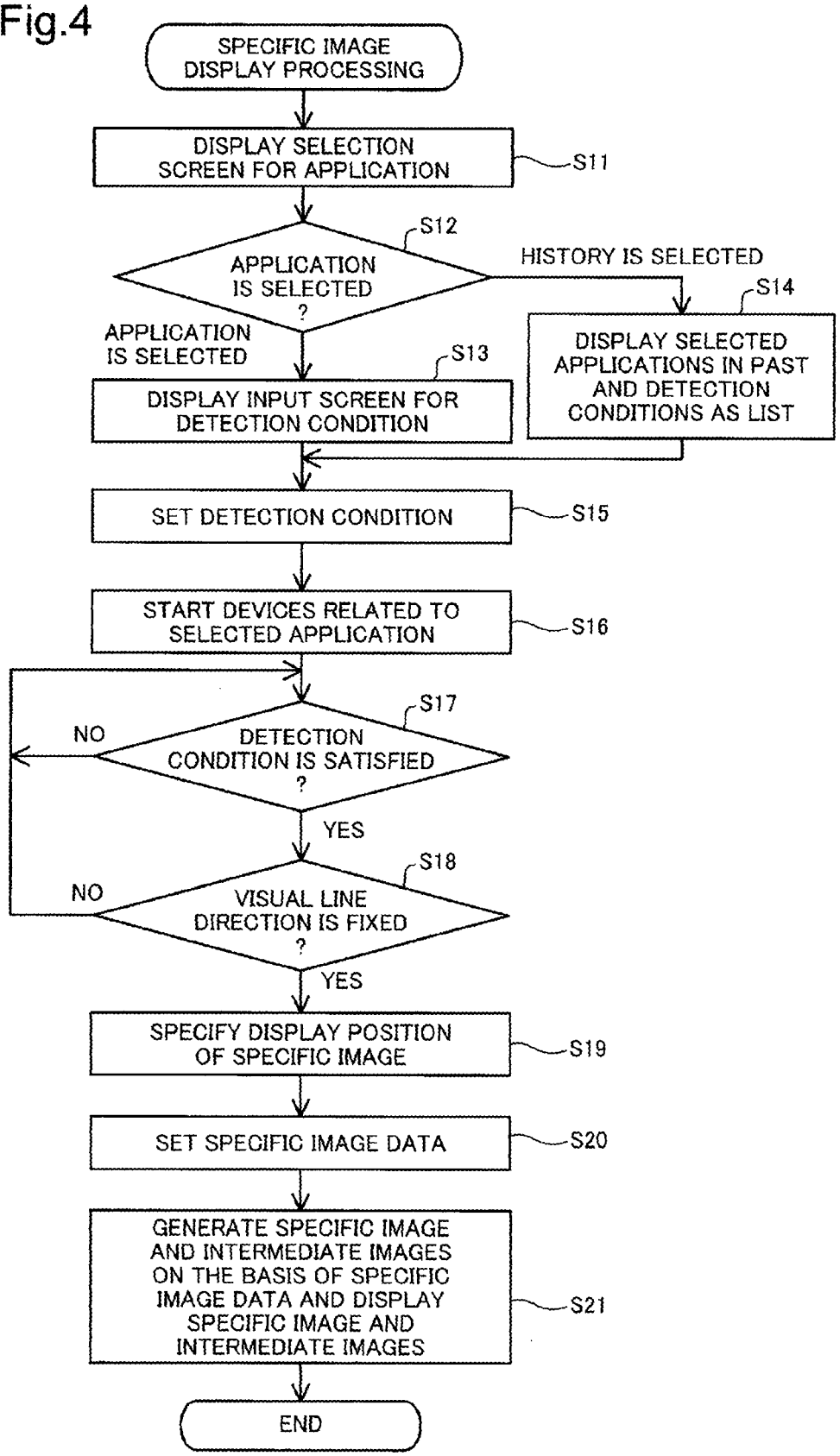
FIG. 4 is an explanatory diagram showing a flow of specific image display processing.

FIG. 4 is an explanatory diagram showing a flow of specific image display processing. In the specific image display processing, after a predetermined detection condition is selected, specific image data is created according to the selected detection condition and a specific image is displayed on the image display unit 20.

Figure 5:
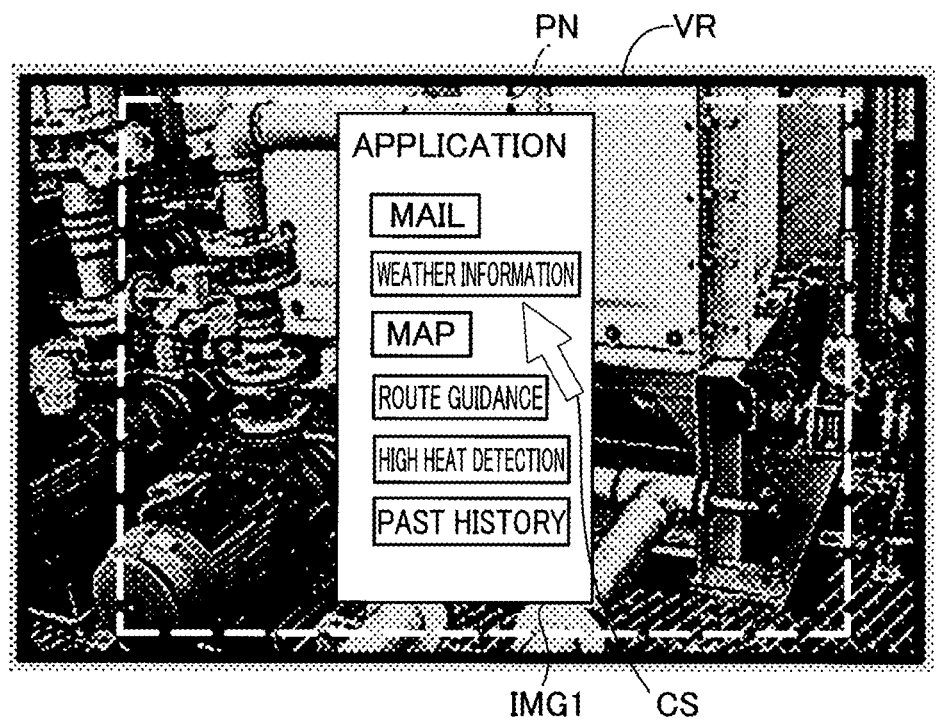
FIG. 5 is an explanatory diagram showing an example of a selection menu screen visually recognized by a user.

In the specific image display processing, first, when the operation unit 135 receives predetermined operation, the specific-image control unit 165 causes the image display unit 20 to display a selection menu screen for an application (step S11). FIG. 5 is an explanatory diagram showing an example of a selection menu screen IMG1 visually recognized by the user. In FIG. 5, a visual field VR visually recognized by the user is shown. An image display largest region PN indicates an outer frame of a largest region in which image light is formed. In FIG. 5, an broken line of the outer frame of the image display largest region PN is shown for convenience and is not visually recognized by the user. As shown in FIG. 5, in the image display largest region PN, the selection menu screen IMG1 and a cursor CS are shown. Selection buttons for a selectable plurality of applications are included in the selection menu screen IMG1 displayed in the image display largest region PN. When the operation unit 135 is operated by the user, the cursor CS moves in the image display largest region PN. When the determination key 11 is depressed in a state in which the cursor CS overlaps any one of the buttons, the button is selected.

After the selection menu screen IMG1 is displayed (step S11 in FIG. 4), when a specific application is selected by the user (step S12: application is selected), the specific-image control unit 165 causes the image display unit 20 to display a screen corresponding to the application selected by the user (hereinafter simply referred to as "selected application") as well. When the selected application is a detection application, the specific-image control unit 165 causes the image display unit 20 to display an input screen for a detection condition (step S13). When a past history included in the selection menu screen IMG1 is selected in the processing in step S12 (step S12: history is selected), the specific-image control unit 165 causes the image display unit 20 to display selected applications in the past and detection conditions of the respective selected applications (step S14). In explanation in this embodiment, a heat detection application is selected. In the heat detection application, a setting screen for a lower limit temperature to be detected is displayed on the image display unit 20 as an input screen for a detection condition.

After the processing in step S13 and the processing in step S14, when the operation unit 135 is operated by the user, a lower limit temperature, which is a detection condition, is set (step S15). When the lower limit temperature is set, the specific-image control unit 165 starts the thermography 62 and the 9-axis sensor 66, which are devices related to the heat detection application (step S16).

Subsequently, the specific-image control unit 165 detects a region having temperature equal to or higher than a threshold satisfying the detection condition in a temperature distribution image picked up by the thermography 62 (step S17). When a region having temperature equal to or higher than the threshold is not detected (step S17: NO), the specific-image control unit 165 continues to monitor a region having temperature equal to or higher than the threshold. When a region having temperature equal to or higher than the threshold is detected (step S17: YES), the visual-line-direction determining unit 166 determines whether a visual line direction of the user is fixed (step S18).

When it is determined in the processing in step S18 that the visual line direction of the user is not fixed (step S18: NO), while continuing to monitor detection of a region having temperature equal to or higher than the threshold (step S17), the specific-image control unit 165 waits for the visual line direction of the user to be fixed (step S18). When it is determined in the processing in step S18 that the visual line direction of the user is fixed (step S18: YES), the specific-image control unit 165 specifies the region having the temperature equal to or higher than the threshold as a position where the specific image is displayed (step S19). In a state in which the region having the temperature equal to or higher than the threshold is detected, in some case, the visual line direction of the user is not fixed. Therefore, when the region having the temperature equal to or higher than the threshold is detected and the visual line direction of the user is fixed, the region having the temperature equal to or higher than the threshold is specified.

Figure 6:
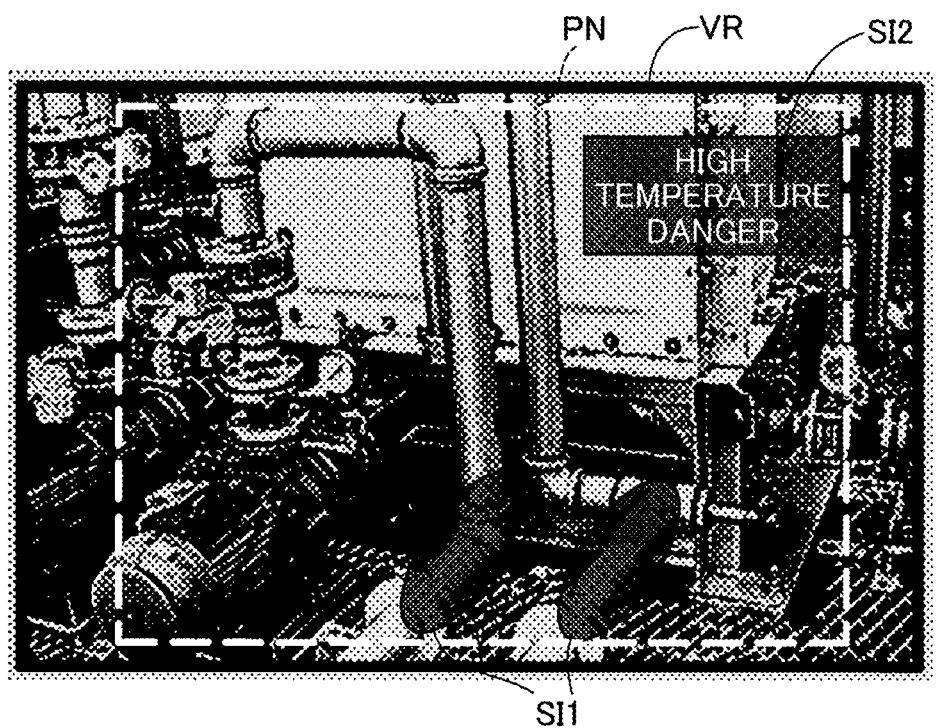
FIG. 6 is an explanatory diagram showing an example of a specific image visually recognized by the user.

When the region having the temperature equal to or higher than the threshold is specified (step S19), the specific-image control unit 165 sets specific image data corresponding to the specified region (step S20). FIG. 6 is an explanatory diagram showing an example of a specific image visually recognized by the user. In FIG. 6, the visual field VR visually recognized by the user is shown. In FIG. 6, a specific image SI1 and a specific image SI2 displayed in the image display largest region PN and generated on the basis of the specific image data (hereinafter collectively referred to as "specific images SI1 and SI2" as well) are shown. The specific image SI1 is an image showing the region having the temperature equal to or higher than the threshold detected by the thermography 62. The specific image SI2 is a message image for informing the user that the region indicated by the specific image I1 has the temperature equal to or higher than the threshold and is dangerous because of the high temperature.

Figure 7:
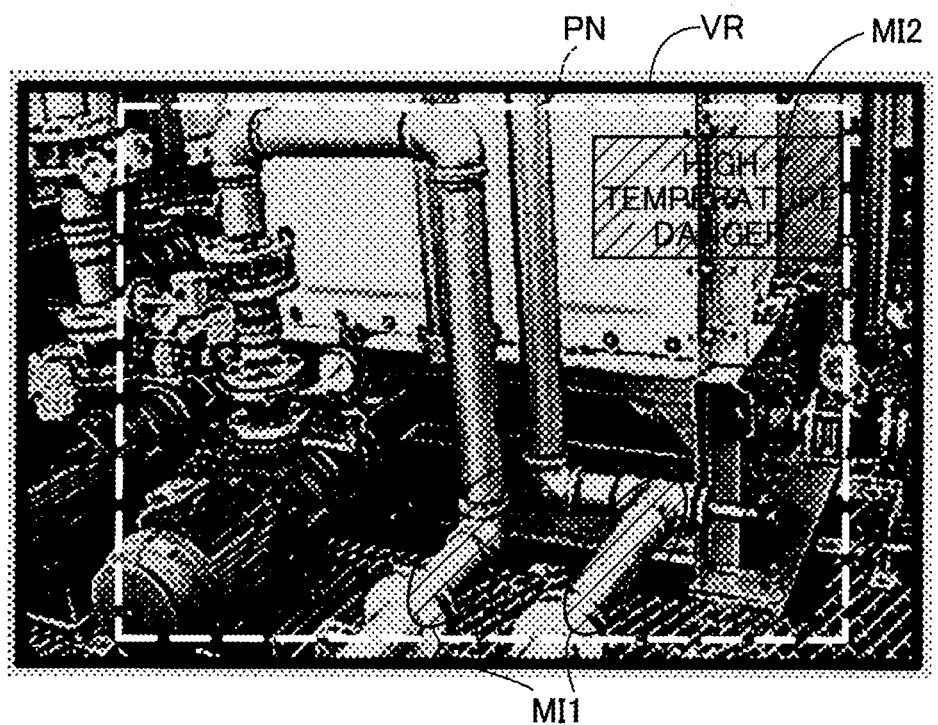
FIG. 7 is an explanatory diagram showing an example of an intermediate image visually recognized by the user.

When the specific image data is set (step S20 in FIG. 4), the specific-image control unit 165 generates a specific image and a plurality of intermediate images on the basis of the set specific image data and causes the image display unit 20 to display the specific image and a plurality of intermediate images (step S21). FIG. 7 is an explanatory diagram showing an example of an intermediate image visually recognized by the user. In FIG. 7, an intermediate image MI1 and an intermediate image MI2 displayed in the image display largest region PN (hereinafter collectively referred to as "intermediate images MI1 and MI2" as well) are shown. The intermediate image MI1 is an image showing the region having the temperature equal to or higher than the threshold detected by the thermography 62, that is, a region same as the specific image SI1. The intermediate image MI2 is an image showing a region same as the specific image SI2. In FIGS. 6 and 7, the thickness of a color of an image corresponding to luminance is indicated by the thickness of hatching.

The intermediate image is an image generated with luminance set to be lower than 100% on the basis of the specific image data when the luminances of the specific images SI1 and SI2 are set to 100%. That is, the plurality of intermediate images and the specific images SI1 and SI2 are images generated on the basis of the same specific image data and only having different luminances. Therefore, the plurality of intermediate images are generated according to the number of luminances. For example, when luminances are set to 10%, 35%, 65%, and 100%, three intermediate images and one specific image are generated on the basis of the specific image data.

Figure 8:
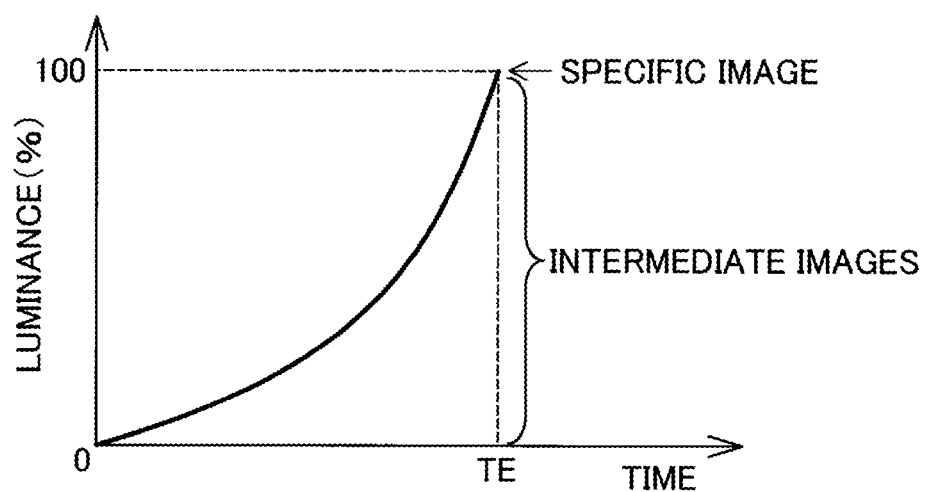
FIG. 8 is an explanatory diagram showing an example of temporal transition of the luminance of backlights in image display processing.

FIG. 8 is an explanatory diagram showing an example of temporal transition of the luminance of the backlights 221 and 222 in image display processing. In FIG. 8, with the abscissa set as a time axis, a change in luminance in a period TE (e.g., 3 seconds) from a state in which an image is displayed on the image display unit 20 until the specific images SI1 and SI2 are displayed is shown. When the luminance is changed on the basis of the same specific image data, after the plurality of intermediate images are displayed on the image display unit 20, the specific images SI1 and SI2 are displayed.

As shown in FIG. 8, when the intermediate images MI1 and MI2 are displayed, the specific-image control unit 165 increases the luminance of the backlights 221 and 222 such that an increase ratio of the luminance increases according to elapse of time. Therefore, when temperature equal to or higher than the threshold is detected, rather than causing the user to visually recognize the specific images SI1 and SI2 at an instance of the detection, the specific-image control unit 165 causes the user to visually recognize the specific images SU and SI2 after causing the user to visually recognize the plurality of intermediate images having different luminances. Consequently, the specific-image control unit 165 causes the user to visually recognize as if the specific images SI1 and SI2 gradually emerge (hereinafter referred to as "fade-in display" as well). The plurality of intermediate images and each of the specific images SI1 and SI2 are equivalent to a plurality of kinds of first image light and a second image light in the appended claims.

When the plurality of intermediate images and the specific images SI1 and SI2 are displayed on the image display unit 20 (step S21 in FIG. 4), the specific-image control unit 165 ends the specific image display processing.

A-3. Specific Image Non-Display Processing

Figure 9:
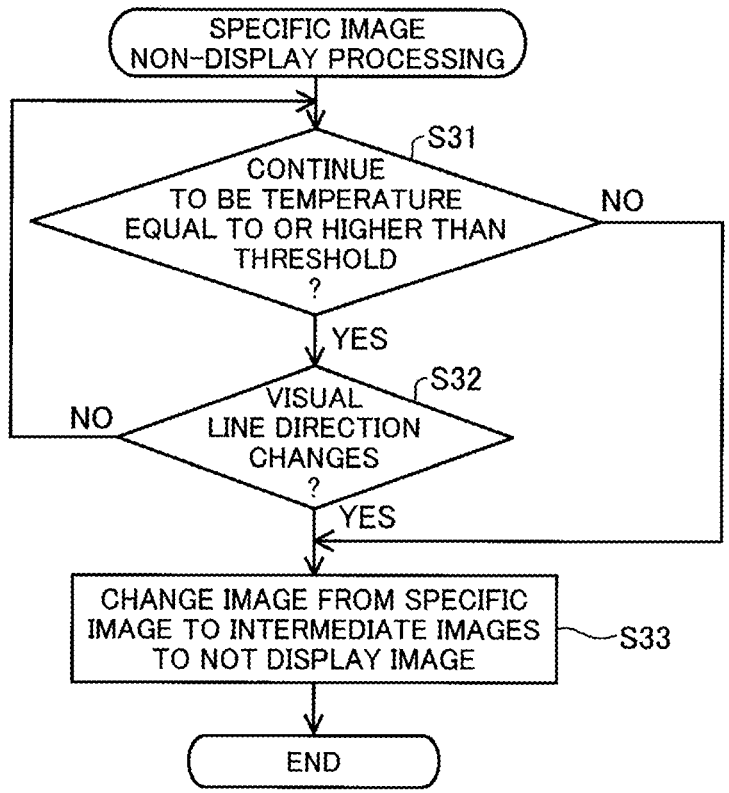
FIG. 9 is an explanatory diagram showing a flow of specific image non-display processing.

FIG. 9 is an explanatory diagram showing a flow of specific image non-display processing. In the specific image non-display processing, a state in which a specific image is detected according to a set detection condition and displayed on the image display unit 20 is changed to a state of non-display of the specific image when the specific image does not satisfy the detection condition or when a visual line direction of the user is changed.

In the specific image non-display processing, first, the specific-image control unit 165 determines whether the temperature of a region detected as temperature equal to or higher than the threshold continues to be the temperature equal to or higher than the threshold (step S31). When it is determined that the temperature of the region is the temperature equal to or higher than the threshold (step S31: YES), the visual-line-direction determining unit 166 detects a change in the visual line direction of the user (step S32). When a change in the visual line direction of the user is not detected, that is, the visual line direction of the user remains fixed (step S32: NO), the specific-image control unit 165 continues to monitor the temperature of the region detected as the temperature equal to or higher than the threshold (step S31). The visual-line-direction determining unit 166 monitors the visual line direction of the user (step S32).

When it is determined in the processing in step S31 that the temperature of the region detected as the temperature equal to or higher than the threshold (step S31: NO) and when a change in the visual line direction of the user is detected in the processing in step S32 (step S32: YES), after changing the specific images SI1 and SI2 displayed on the image display unit 20 to a plurality of intermediate images having different luminances according to elapse of time, the specific-image control unit 165 sets the luminance to 0% and sets the intermediate images to non-display (step 33).

Figure 10:
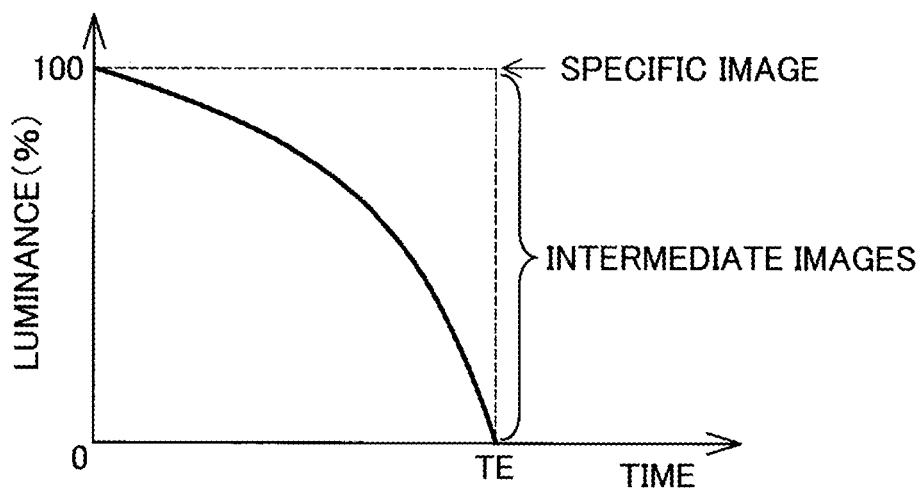
FIG. 10 is an explanatory diagram showing an example of temporal transition of the luminance of the backlights in image non-display processing.

FIG. 10 is an explanatory diagram showing an example of temporal transition of the luminance of the backlights 221 and 222 in the image non-display processing. In FIG. 10, with the abscissa set as a time axis, a change in luminance in the period TE from a state in which the specific images SI1 and SI2 are displayed on the image display unit 20 until the images are not displayed on the image display unit 20 is shown. When the specific-image control unit 165 changes images to be displayed on the image display unit 20 from the specific images SU and SI2 to a plurality of intermediate images having different luminances, the specific-image control unit 165 reduces the luminance such that a decrease ratio of the luminance increases according to elapse of time. Therefore, for example, when the temperature equal to or higher than the threshold is not detected and when the visual line direction of the user changes, the specific images SI1 and SI2 do not instantaneously cease to be visually recognized by the user. The user visually recognizes as if the specific images SI1 and SI2 change to a plurality of intermediate images having different luminances and gradually disappear (hereinafter simply referred to as "fade-out display" as well).

When the specific images SI1 and SI2 and the plurality of intermediate images are displayed on the image display unit 20 (step S33 in FIG. 9), the specific-image control unit 165 ends the specific image non-display processing.

As explained above, in the head mounted display device 100 in this embodiment, the operation unit 135 causes the image display unit 20 to display the specific images SU and SI2, which are generated on the basis of the specific image data and change according to the elapse of time, and the intermediate images MI1 and MI2. Therefore, in the head mounted display device 100 in this embodiment, since an image visually recognized by the user gently changes according to the elapse of time, the burden on the visual sense of the user is reduced.

In the head mounted display device 100 in this embodiment, the specific-image control unit 165 detects temperature equal to or higher than the threshold and, then, after causing the image display unit 20 to display a plurality of intermediate images having different luminances, causes the image display unit 20 to display the specific images SI1 and SI2. The plurality of intermediate images are generated on the basis of specific image data created on the basis of a temperature distribution image acquired by the thermography 62. The specific images SI1 and SI2 are images generated on the basis of the specific image data and different from the plurality of intermediate images. Therefore, the head mounted display device 100 in this embodiment causes the user to visually recognize the specific images SI1 and SI2 after causing the user to visually recognize the intermediate images according to the elapse of time rather than causing the user to suddenly visually recognize the specific images SI1 and SI2 in a state in which only the outside scene is visually recognized. Therefore, since changes of the outside scene and the images visually recognized by the user are gentle, it is possible to further reduce the burden on the visual sense of the user.

In the head mounted display device 100 in this embodiment, the plurality of intermediate images and the specific images SI1 and SI2 are images different only in luminance generated on the basis of the same specific image data. The specific image control unit 165 adjusts the luminances of the plurality of intermediate images and the specific images SI1 and SI2 to be different by adjusting a light amount of the backlights 221 and 222. Therefore, in the head mounted display device 100 in this embodiment, it is possible to generate the plurality of intermediate images and the specific images SI1 and SI2 on the basis of one image data simply by controlling the luminances. Therefore, it is possible to reduce the burden on the visual sense of the user with simple control.

In the head mounted display device 100 in this embodiment, the specific-image control unit 165 causes the image display unit 20 to display the plurality of intermediate images having different luminances in the period TE (e.g., 3 seconds) set in advance and, when the period TE ends, causes the image display unit 20 to display the specific images SI1 and SI2 having luminances respectively larger than the luminances of the plurality of intermediate images. When the specific-image control unit 165 displays the intermediate images MI1 and MI2, the specific-image control unit 165 increases the luminance of the backlights 221 and 222 such that an increase ratio of the luminance increase according to elapse of time. In the period TE, the specific-image control unit 165 changes the specific images SI1 and SI2 displayed on the image display unit 20 to a plurality of intermediate images having different luminances to display no image on the image display unit 20 after the end of the period TE. When the specific-image control unit 165 changes images to be displayed on the image display unit 20 from the specific images SI1 and SI2 to the plurality of intermediate images having different luminances, the specific-image control unit 165 reduces the luminances such that a decrease ratio of the luminances increases according to the elapse of time. Therefore, in the head mounted display device 100 in this embodiment, it is possible to cause the user to visually recognize as if the specific images SI1 and SI2 gradually emerge through the plurality of intermediate images. Therefore, it is possible to further reduce the burden on the visual sense of the user.

In the head mounted display device 100 in this embodiment, the thermography 62 generates a temperature distribution image representing a distribution of temperature. The specific-image control unit 165 creates specific image data according to the generated temperature distribution image. Therefore, in the head mounted display device 100 in this embodiment, it is possible to cause the user to visually recognize an image involved in a temperature change of the outside scene. Therefore, convenience for the user is improved.

In the head mounted display device 100 in this embodiment, the 9-axis sensor 66 detects a movement of the head of the user. The visual-line-direction determining unit 166 specifies a visual line direction of the user according to the detected movement of the head. When the visual line direction of the user is fixed, the specific-image control unit 165 creates specific image data. Therefore, when the visual line direction of the user is not fixed, the head mounted display device 100 in this embodiment does not cause the user to visually recognize the intermediate images and the specific images SI1 and SI2. Therefore, even if the user changes the visual line direction, the transmitted outside scene only changes. The user does not have to visually recognize a generated image. Therefore, there is little change in the outside scene visually recognized by the user. The burden on the visual sense of the user is further reduced.

B. Second Embodiment

Figure 11:
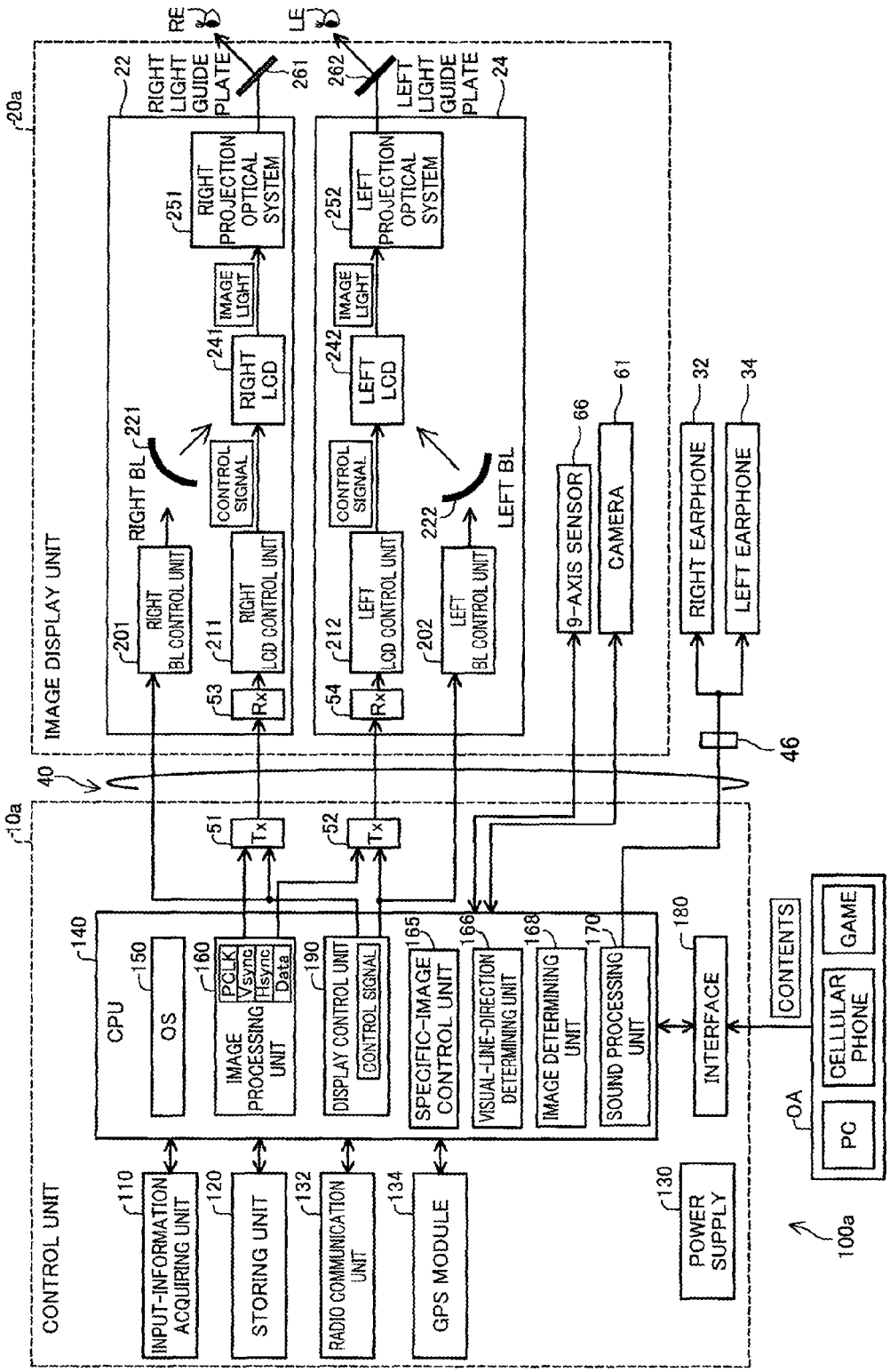
FIG. 11 is a block diagram functionally showing the configuration of a head mounted display device in a second embodiment.

FIG. 11 is a block diagram functionally showing the configuration of a head mounted display device 100a in a second embodiment. The head mounted display device 100a is different from the head mounted display device 100 in the first embodiment in that a camera 61 is formed in an image display unit 20a instead of the thermography 62 and a GPS module 134, a radio communication unit 132, and an image determining unit 168 are formed in a control unit 10a. The other components are the same.

Like the thermography 62, the camera 61 is arranged in a position corresponding to the middle of the forehead of a user when the user wears the image display unit 20a. The camera 61 picks up an image of an outside scene, which is a scene on the outside of a visual line direction of the user, and acquires an outside scene image. The camera 61 is a monocular camera but may be a stereo camera. The camera 61 is equivalent to an image pickup unit in the appended claims.

The GPS module 134 receives a signal from a GPS satellite to thereby specify the present position of the image display unit 20a and generates information indicating the position. Since the present position of the image display unit 20a is detected, the present position of the user of the head mounted display device 100a is specified. The GPS module 134 is equivalent to a position-information acquiring unit in the appended claims.

The radio communication unit 132 transmits and receives various kinds of information such as weather information and road traffic information to and from other apparatuses according to a predetermined radio communication standard such as a wireless LAN or Bluetooth. The image determining unit 168 determines, through pattern matching, whether an image (e.g., an image of "sky") same as a specific target image representing image data stored in advance in the storing unit 120 is included in the outside scene image. The image determining unit 168 is equivalent to a target extracting unit in the appended claims.

The specific-image control unit 165 in the second embodiment not only performs detection of temperature but also performs detection of a specific target image included in the outside scene image and performs various kinds of control on the basis of the present position and like of the user and causes the image display unit 20a to display a specific image and a plurality of intermediate images. For example, the specific-image control unit 165 specifies a region of the sky included in the outside scene image. When the visual line direction of the user is fixed, the specific-image control unit 165 generates specific image data indicating the weather information received via the radio communication unit 132.

Figure 12:
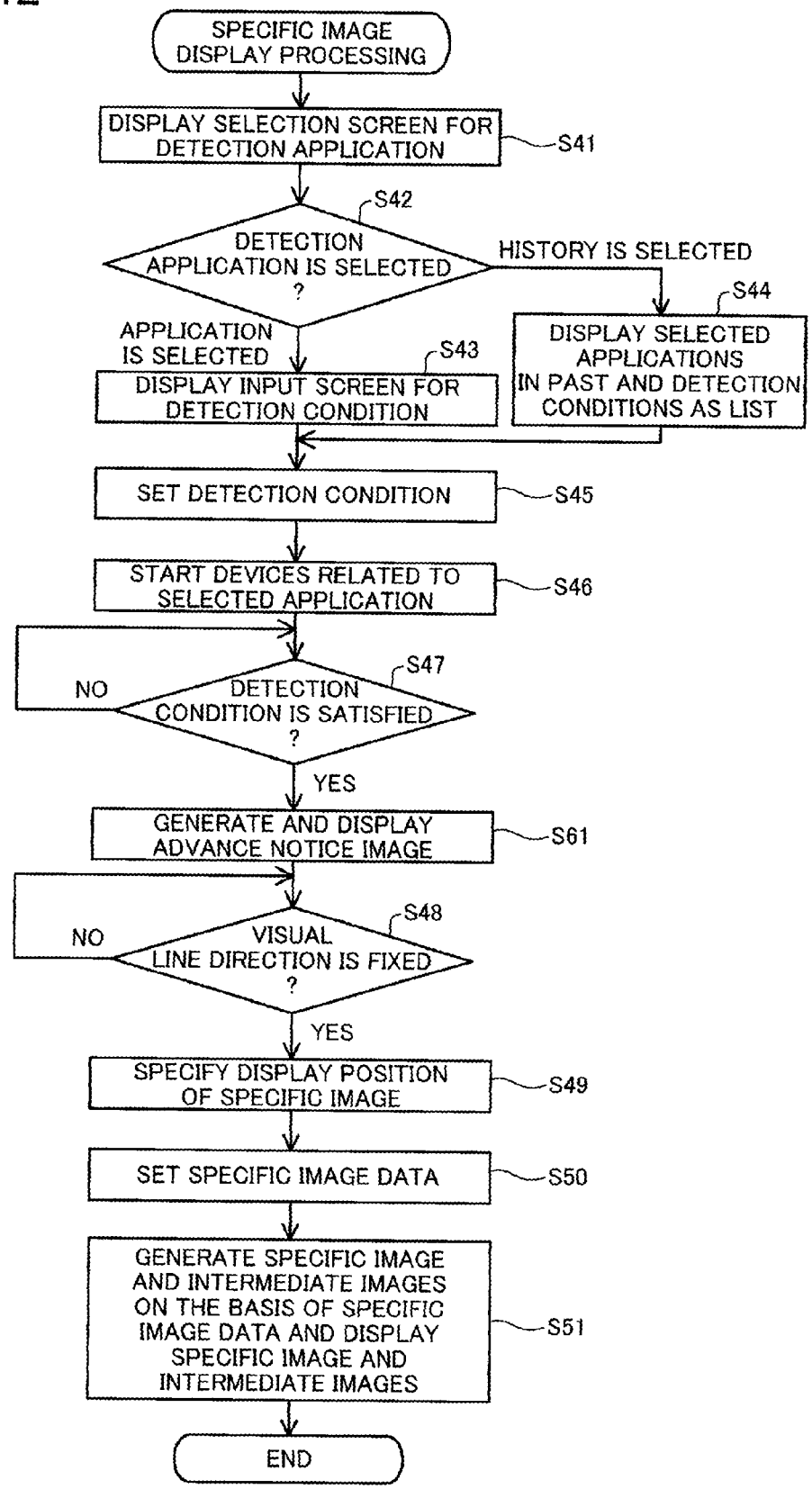
FIG. 12 is an explanatory diagram showing a flow of specific image display processing in the second embodiment.

FIG. 12 is an explanatory diagram showing a flow of specific image display processing in the second embodiment. The specific image display processing in the second embodiment is different from the specific image display processing in the first embodiment in a detection application to be selected and a specific image and a plurality of intermediate images to be generated. Therefore, in the second embodiment, compared with the first embodiment, processing for generation and display of an advance notice image in step S61 is added anew. Otherwise, the second embodiment is the same as the first embodiment. In explanation in the second embodiment, an application of "weather information (FIG. 5)" (hereinafter referred to as "weather application" as well), which is a detection application, is selected. The advance notice image is equivalent to a plurality of kinds of first image light in the appended claims.

In the specific image display processing, when a detection condition of the weather application is set (step S45 in FIG. 12), the specific-image control unit 165 starts the camera 61, the 9-axis sensor 66, the radio communication unit 132, and the GPS module 134, which are devices related to the weather application (step S46).

The image determining unit 168 determines as the detection condition whether a target image of "sky" is in a region equal to or larger than a predetermined region in the outside scene image (e.g., equal to or larger than a half of the outside scene image) (step S47). When it is determined that the target image is not included in the outside scene image (step S47: NO), the image determining unit 168 continues to monitor detection of the target image (step S47). When it is determined that the target image is included in the outside scene image (step S47: YES), the specific-image control unit 165 creates one advance notice image data in which an entire region where the target image is detected on the basis of the specific image data is set as a region of a candidate representing a specific image. The specific-image control unit 165 causes the image display unit 20a to display a plurality of advance notice images based on the one advance notice image data (step S61).

Figure 13:
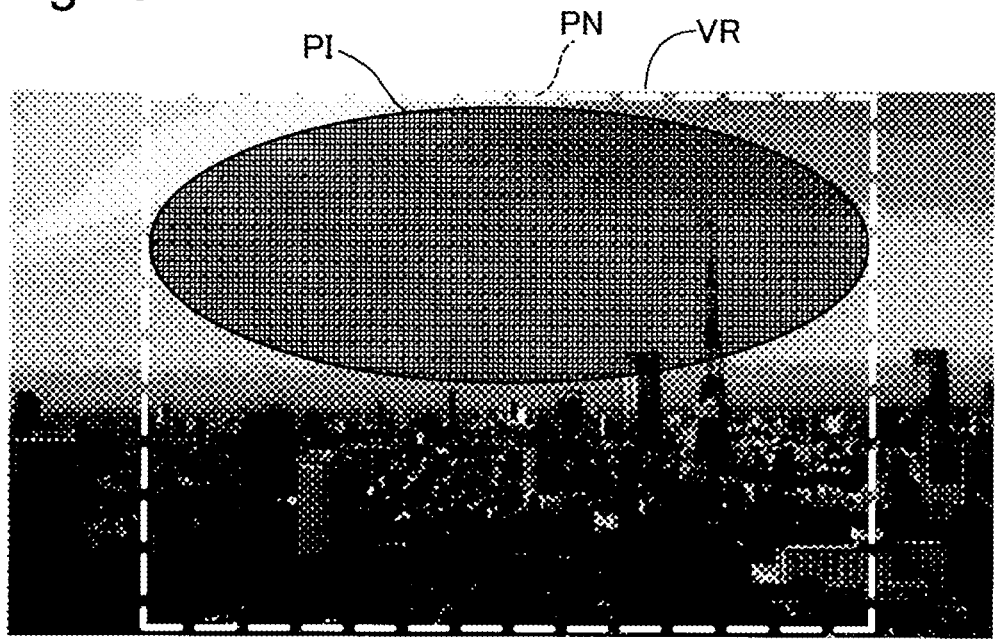
FIG. 13 is an explanatory diagram showing an example of an advance notice image visually recognized by a user.

FIG. 13 is an explanatory diagram showing an example of an advance notice image PI visually recognized by the user. As shown in FIG. 13, the advance notice image PI is displayed in the image display largest region PN. The advance notice image PI is an image generated to correspond to the entire region determined as the target image of "sky" by the image determining unit 168 in the picked-up outside scene image. A plurality of advance notice images are generated on the basis of the same advance notice image data by increasing the luminance of the backlights 221 and 222 according to elapse of time.

After the advance notice image is displayed on the image display unit 20a (step S61 in FIG. 12), the visual-line-direction determining unit 166 determines whether the visual line direction of the user is fixed (step S48). When it is determined that the visual line direction of the user is not fixed (step S48: NO), the visual-line-direction determining unit 166 continues to wait for the visual line direction of the user to be fixed (step S48). When it is determined in the processing in step S48 that the visual line direction of the user is fixed (step S48: YES), the specific-image control unit 165 specifies a position where a specific image is displayed in a region where the advance notice image is displayed (step S49).

Figure 14:
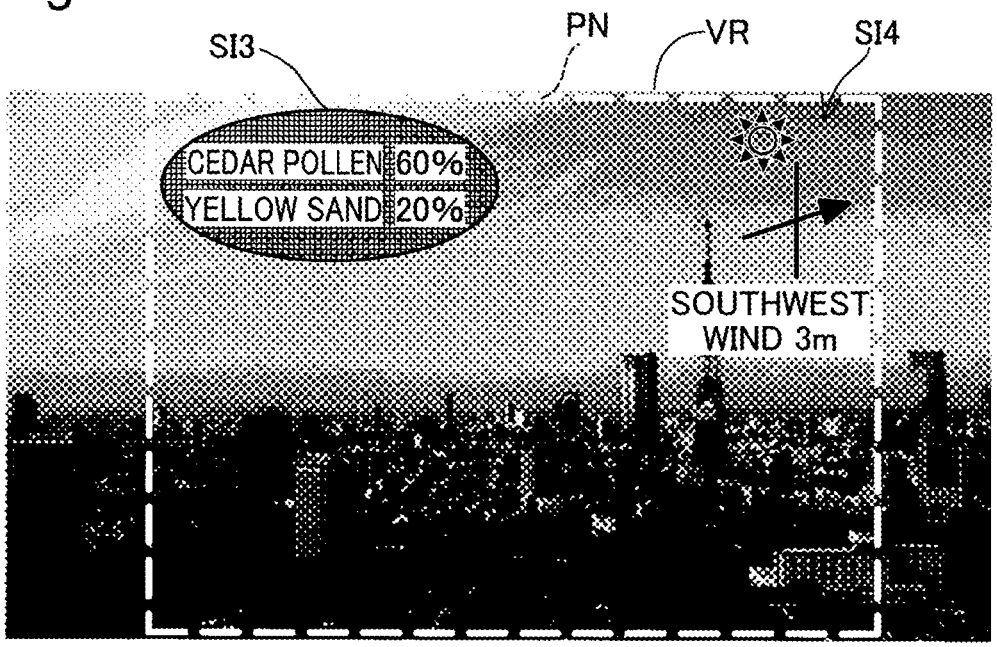
FIG. 14 is an explanatory diagram of an example of a specific image visually recognized by the user.

FIG. 14 is an explanatory diagram showing an example of a specific image visually recognized by the user. In FIG. 14, a specific image SI3 and a specific image SI4 displayed in the image display largest region PN is shown. The specific images SI3 and SI4 are images generated on the basis of the specific image data created by the specific image control unit 165 on the basis of the information received from the radio communication unit 132. The specific-image control unit 165 displays the specific image SI3 on the upper left and displays the specific image SI4 on the upper right in the region where the advance notice image is displayed.

As explained above, in the head mounted display device 100a in the second embodiment, the camera 61 picks up an image of the outside scene, which is a scene on the outside in the visual direction of the user, and acquires an outside scene image. The image determining unit 168 determines, according to pattern matching, whether an image same as a specific target image is included in the outside scene image. The GPS module 134 receives a signal from the GPS satellite to thereby specify the present position of the user of the head mounted display device 100a. Therefore, in the head mounted display device 100a in the second embodiment, an image that the user is caused to visually recognize can be controlled on the basis of detection of the specific target image included in the outside scene image and position information of the user. Therefore, convenience for the user is improved.

C. Third Embodiment

In a third embodiment, specific image display processing and specific image changing processing for changing a specific image according to a detection condition are performed according to a detection application different from the detection application in the embodiment explained above. In explanation in the third embodiment, a work support application for performing work support for a user is selected as the detection application.

Figure 15:
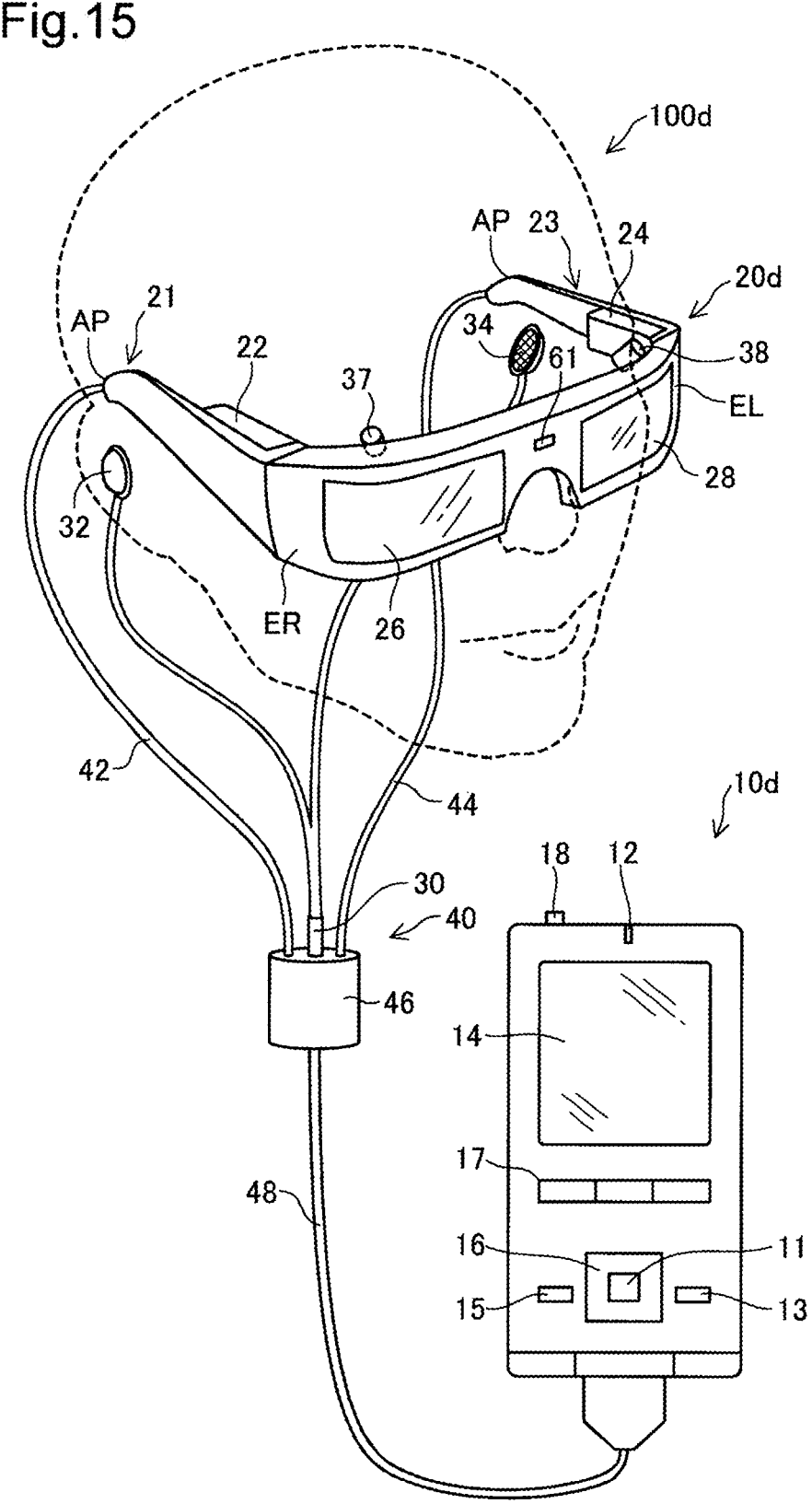
FIG. 15 is an explanatory diagram showing the external configuration of a head mounted display device in a third embodiment.

FIG. 15 is an explanatory diagram showing the configuration of the external appearance of a head mounted display device 100d in the third embodiment. As shown in FIG. 15, the head mounted display device 100d is different from the head mounted display devices in the embodiments in that aright eye image pickup camera 37 and a left eye image pickup camera 38 are arranged in an image display unit 20d. The head mounted display device 100d is the same as the head mounted display devices in the embodiments in the other components. The right eye image pickup camera 37 and the left eye image pickup camera 38 are small CCD cameras that respectively pick up images of the right eye and the left eye of the user. In the following explanation, the right eye image pickup camera 37 and the left eye image pickup camera 38 are collectively referred to as eye image pickup cameras 37 and 38 as well. Images picked up by the eye image pickup cameras 37 and 38 are referred to as eye picked-up images.

Figure 16:
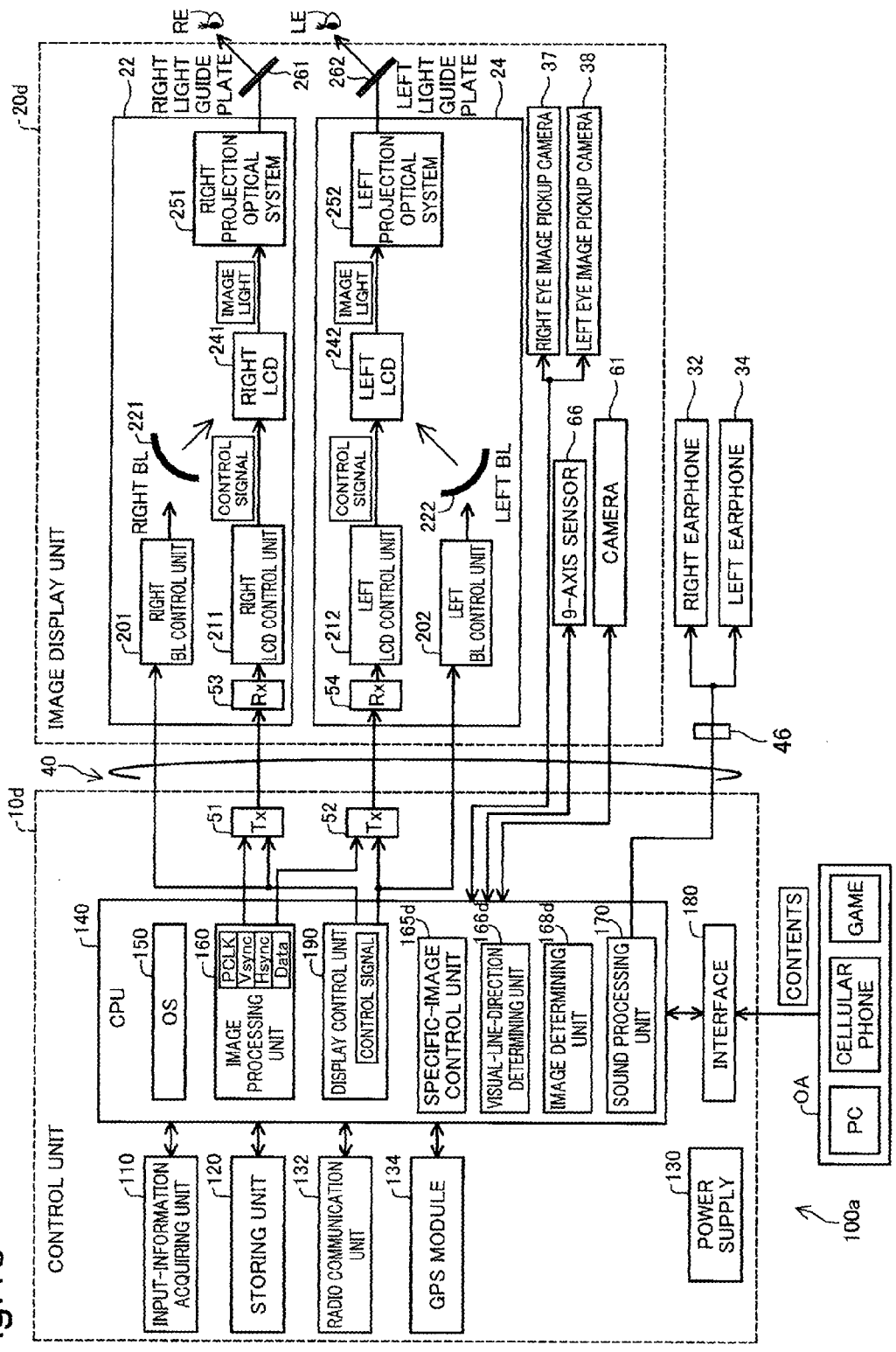
FIG. 16 is a block diagram functionally showing the configuration of the head mounted display device in the third embodiment.

FIG. 16 is a block diagram functionally showing the configuration of the head mounted display device 100d in the third embodiment. In the third embodiment, an image determining unit 168d analyses images of the right eye and the left eye of the user in the eye picked-up image to specify the size of the pupils of the right eye and the left eye. A specific method of specifying the size of the pupils is a method of applying binarization to pixels of picked-up image of the eyes on the basis of predetermined values of RGB, identifying pixels of the whites of the eyes and the irises of the eyes, and determining the size of the pupils according to a ratio of the number of pixels identified as the irises of the eyes to the overall number of the pixels. The image determining unit 168d can specify a direction of view of the user with respect to the direction of the head of the user based on the position of the pixel of the iris in the image of the eye. Therefore, a visual-line-direction determining unit 166d can estimate a more detailed visual line direction of the user by specifying the direction of view of the user with respect to the direction of the head of the user in addition to the direction of the image display unit 20 detected by the 9-axis sensor 66. The eye image pickup cameras 37 and 38 and the image determining unit 168d in the third embodiment are equivalent to a pupil specifying unit in the appended claims.

A specific-image control unit 165d detects whether a specific target stored in advance in the storing unit 120 is included in an outside scene image and specifies the size of the specific target included in the outside scene image to determine a distance between the user and the specific target. If the determined distance is equal to or larger than a threshold, the specific-image control unit 165d determines that the specific target is included in the outside scene image. If the determined distance is smaller than the threshold, even if the specific target is included in the outside scene image, the specific-image control unit 165d does not detect the specific target and determines that the specific target is not included in the outside scene image. The image determining unit 168d can specify relative speed of movement of the specific target in the outside scene image by specifying positions of the specific target in frames of the outside scene image. The camera 61 and the specific-image control unit 165d in the third embodiment are equivalent to a distance specifying unit in the appended claims.

Figure 17:
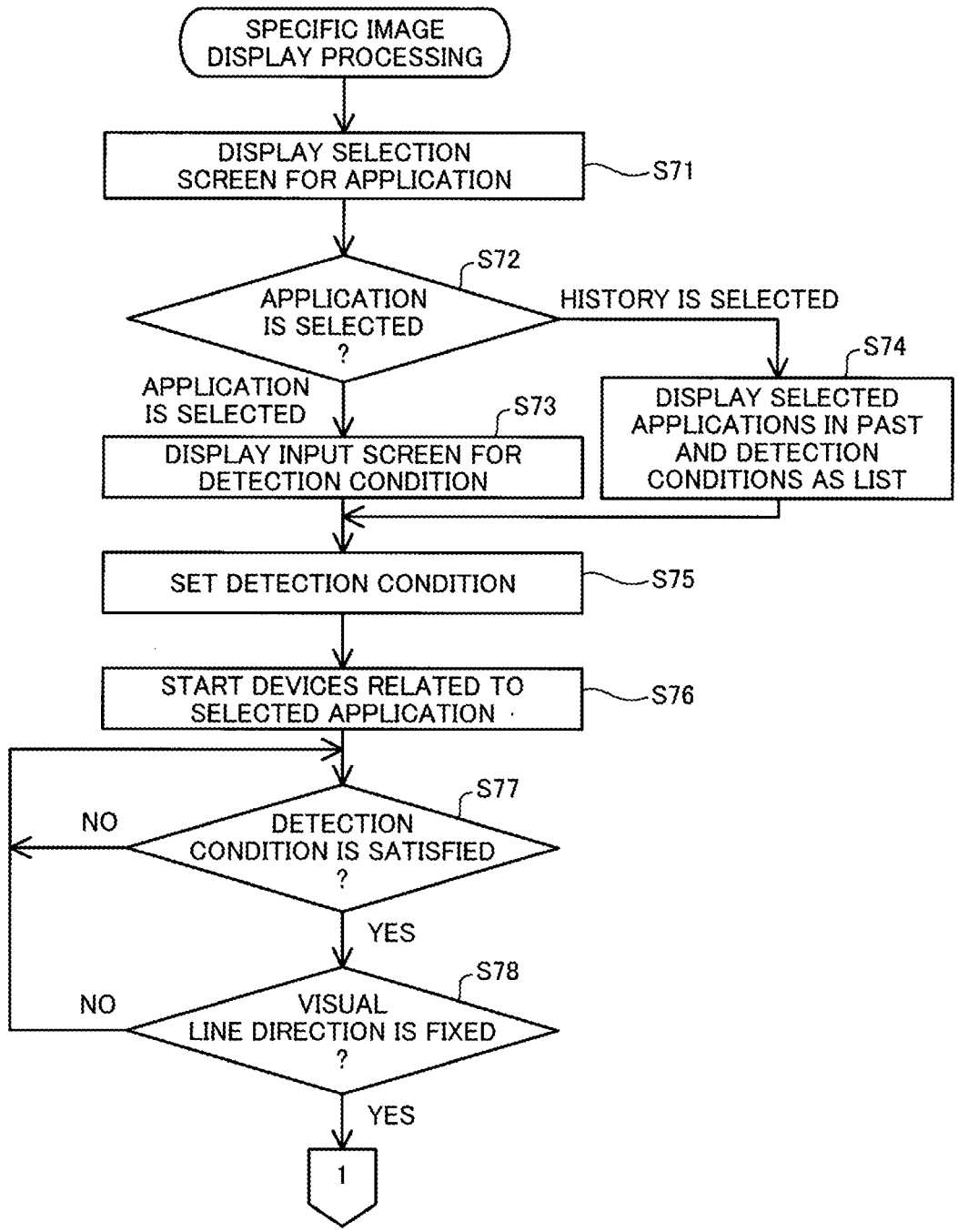
FIG. 17 is an explanatory diagram showing a flow of specific image display processing in the third embodiment.
Figure 18:
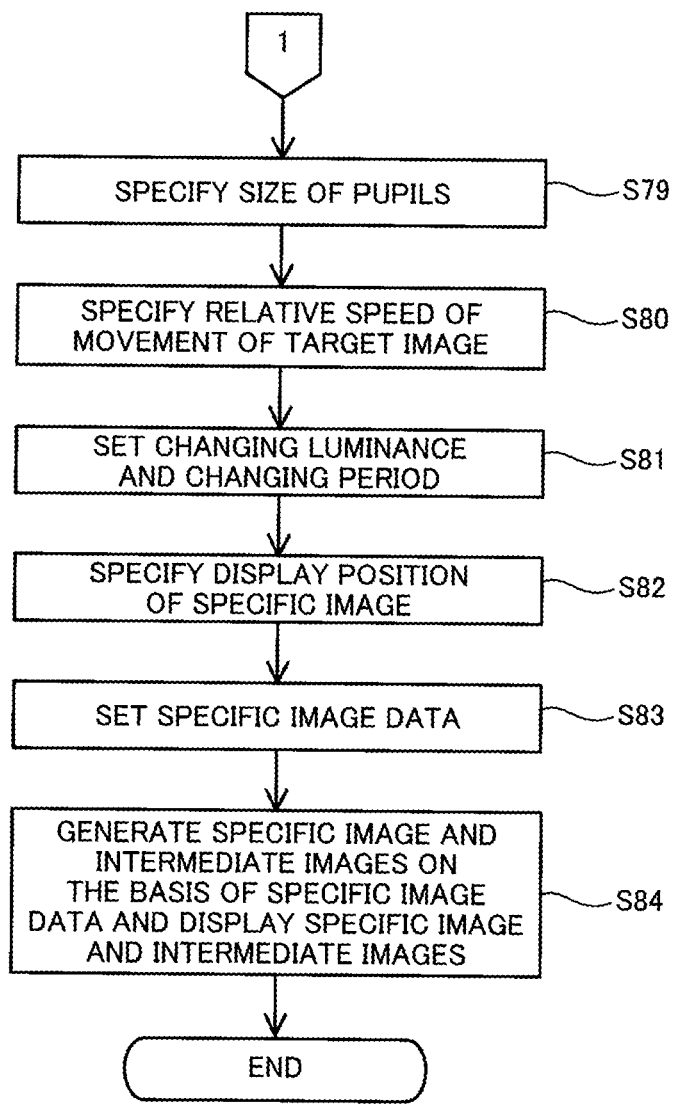
FIG. 18 is an explanatory diagram showing the flow of the specific image display processing in the third embodiment.

FIGS. 17 and 18 are explanatory diagrams showing a flow of specific image display processing in the third embodiment. The specific image display processing in the third embodiment is different from the specific image display processing in the embodiments explained above in processing in step S76 and subsequent steps and is same as the specific image display processing in the embodiments in processing up to step S75. In the third embodiment, when a detection condition of the work support application is set (step S75), the specific-image control unit 165 starts the camera 61, the 9-axis sensor 66, and the eye image pickup cameras 37 and 38, which are the devices related to the work support application (step S76). Subsequently, as the detection condition, the image determining unit 168d determines whether a target image, which is an image of an electric drill serving as a specific target, is included in an outside scene image (step S77). When it is determined that the target image is not included in the outside scene image (step S77: NO), the image determining unit 168d continues to monitor detection of the target image (step S77). When it is determined that the target image is included in the outside scene image (step S77: YES), the visual-line-direction determining unit 166d determines whether the visual line direction of the user is fixed (step S78). When it is determined that the visual line direction of the user is not fixed (step S78: NO), the image determining unit 168d determines that the target image is not detected and continues to monitor detection of the target image (step S77).

When it is determined in the processing in step S78 that the visual line direction of the user is fixed (step S78: YES), the image determining unit 168d specifies the size of the pupils in an eye picked-up image used in fade-in display control explained blow (step S79 in FIG. 18). Subsequently, the image determining unit 168d specifies relative speed of movement of the target image with respect to the outside scene image used for control of the fade-in display (step S80). The specific-image control unit 165d sets, according to the size of the pupils and the relative speed of the movement of the target image, changing luminances, which are luminances changing according to elapse of time, of intermediate images and a specific image in performing the fade-in display and a changing period, which is a period from the start of display of the intermediate images to display of the specific image until completion of the fade-in display (step S81).

Figure 19:
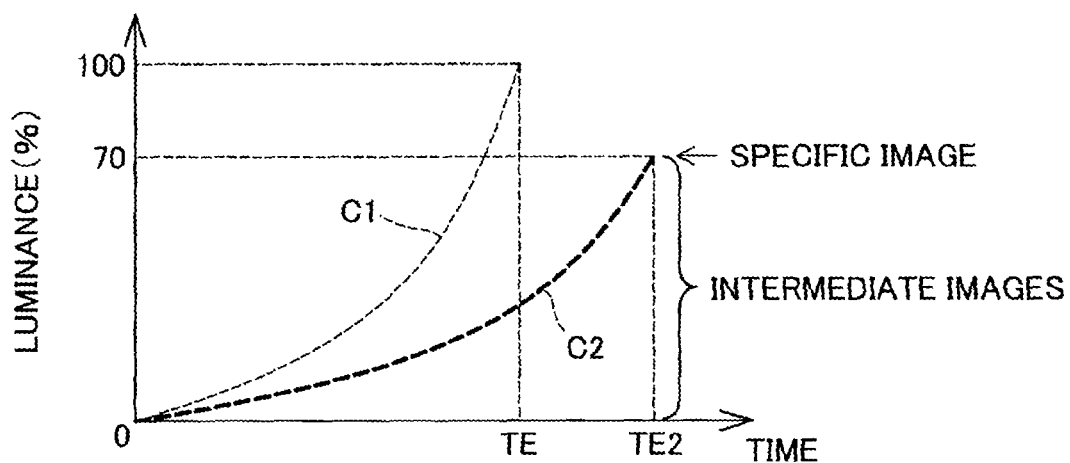
FIG. 19 is an explanatory diagram showing an example of temporal transition of the luminance of backlights in image display processing.

FIG. 19 is an explanatory diagram showing an example of temporal transition of the luminance of the backlights 221 and 222 in image display processing. In FIG. 19, a curve C2 of a change in luminance according to elapse of time in the fade-in display set on the basis of the size of the pupils and the relative speed of the movement of the target image and a curve C1 of a change in the luminance in the first embodiment are shown. The specific-image control unit 165d classifies the size of the pupils into two according to a predetermined threshold. When the luminance of the specific image is set to 100% in the case where the size of the pupils is smaller than the predetermined threshold, the specific-image control unit 165d sets the luminance of the specific image to 70% when the size of the pupils is equal to or larger than the predetermined threshold. In FIG. 19, the size of the pupils in the first embodiment is smaller than the predetermined threshold and the size of the pupils in the third embodiment is equal to or larger than the predetermined threshold. Therefore, in the third embodiment, when the fade-in display is started, the luminances of the intermediate images and the specific image are always smaller than the luminances in the first embodiment. The size of the pupils equal to or larger than the predetermined threshold and the size of the pupils smaller than the predetermined threshold are respectively equivalent to a first size and a second size in the appended claims.

Like the luminance of the specific image, the specific-image control unit 165d classifies the relative speed of the movement of the target image into two according to a predetermined threshold. As shown in FIG. 19, when the relative speed of the movement of the target image is equal to or higher than the predetermined threshold, the specific-image control unit 165d sets the changing period to the period TE as in the first embodiment. When the relative speed of the movement of the target image is lower than the predetermined threshold, the specific-image control unit 165d sets the changing period to a period TE2 longer than the period TE as in the third embodiment. Therefore, in the third embodiment, on the curve C2 in the fade-in display, the changing period from the start of display of the intermediate images until display of the specific image is the period TE2 and the luminance of the specific image is 70% of the luminance in the first embodiment. The intermediate images and the specific image are generated on the same image data.

When the changing luminance and the changing period in the fade-in display are set (step S81 in FIG. 18), as in the embodiments explained above, the specific-image control unit 165d specifies a display position of the specific image based on the work support application, which is the detection application, (step S82) and performs the processing in steps S83 and S84 as in the embodiments.

Figure 20:
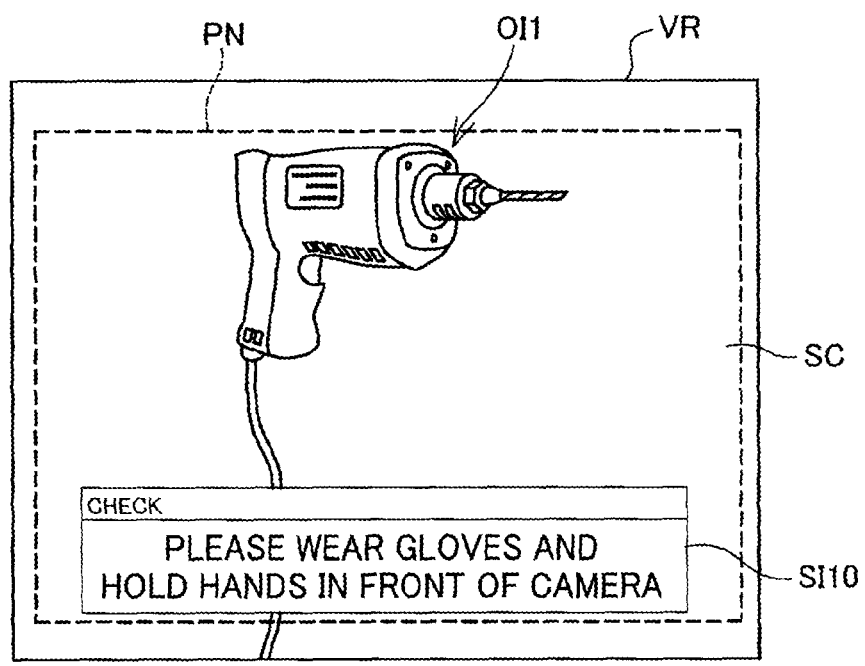
FIG. 20 is an explanatory diagram showing an example of a specific image visually recognized by a user.

FIG. 20 is an explanatory diagram showing an example of a specific image SI10 visually recognized by the user. In FIG. 20, the visual field VR of the user who visually recognizes a target image OI1, which is an image of the electric drill serving as the specific target, is shown. As shown in FIG. 20, the specific-image control unit 165d displays the specific image SI10 in a position not overlapping a main body section of the electric drill other than a cord of the target image OI1 in the outside scene image. Identification of the target image OI1 is performed according to pattern matching as in the embodiments. The specific image SI10 is an image based on image data set in the work support application and is a message image "please wear gloves and hold hands in front of the camera" for urging the user to wear gloves on both hands as work support for use of the electric drill.

Figure 21:
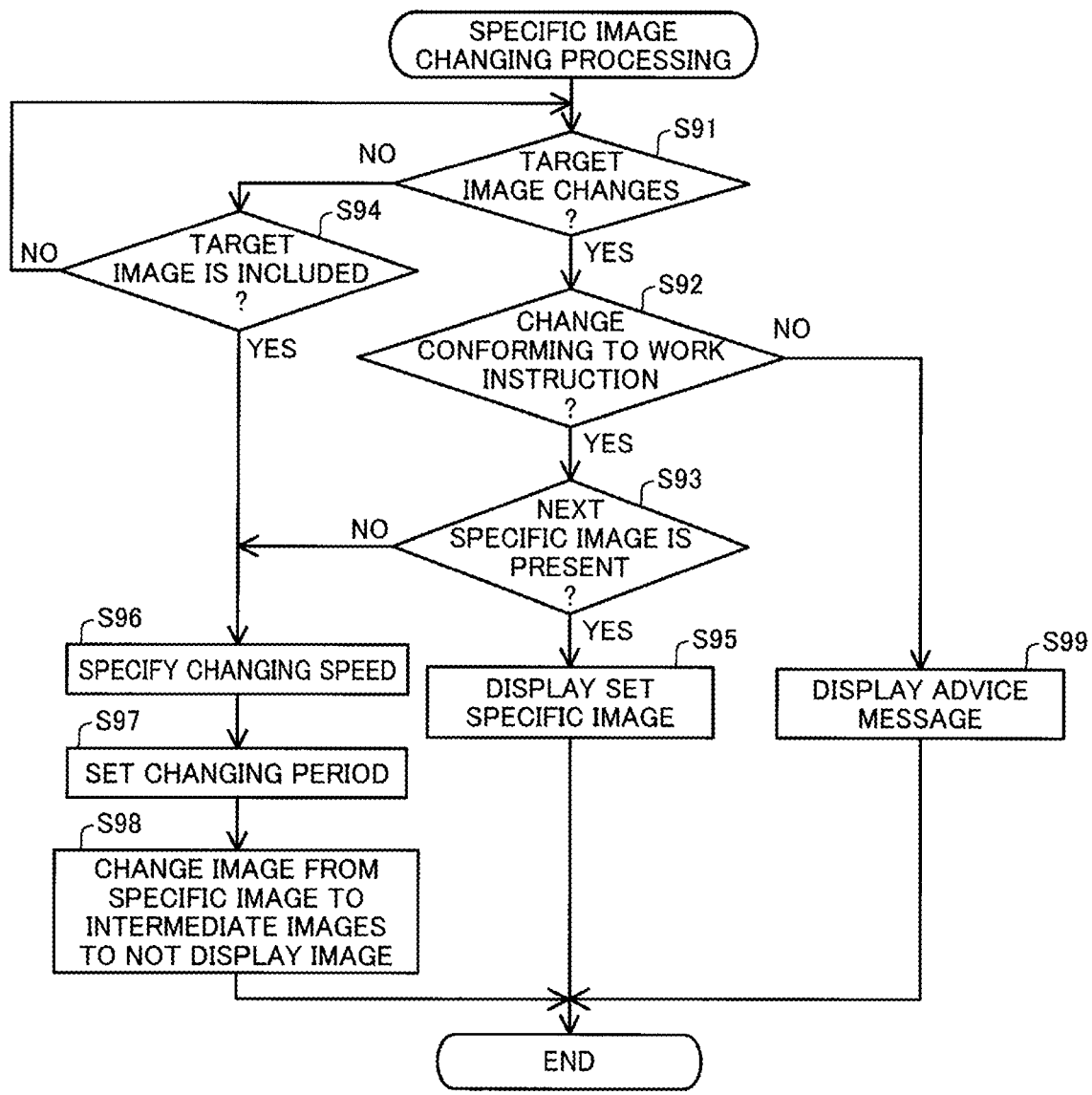
FIG. 21 is an explanatory diagram showing a flow of specific image changing processing.

In the work support application, when a specific condition is satisfied after the specific image SI10 (FIG. 20) is displayed, the specific-image control unit 165d displays a specific image different from the specific image SI10 according to the order of the work support. FIG. 21 is an explanatory diagram showing a flow of specific image changing processing. The specific image changing processing is processing for displaying a specific image based on image data different from image data of the specific image SI10 when the specific condition is satisfied in a state in which the specific image SI10 is displayed.

In the specific image changing processing, first, the specific image control unit 165d determines whether the target image in the outside scene image changes (step S91). When it is determined that the target image changes (step S91: YES), the specific-image control unit 165d determines whether the change of the target image is a change conforming to the set order of the work support (step S92). When it is determined that the change of the target image is the change conforming to the order of the work support (step S93), the specific-image control unit 165d determines whether a specific image set next in the order of the work support is present (step S93). When it is determined that the specific image set next is present (step S93: YES), the specific-image control unit 165d displays the specific image set next (step S95).

Figure 22:
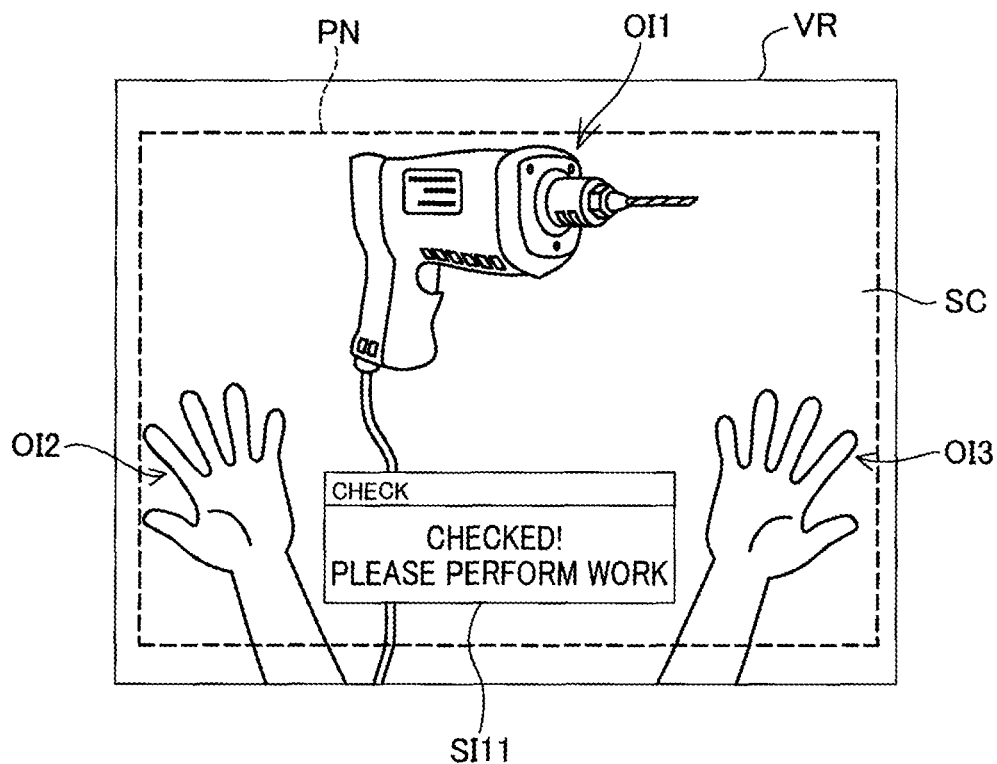
FIG. 22 is an explanatory diagram showing an example of a specific image visually recognized by the user after a target image changes.

FIG. 22 is an explanatory diagram showing an example of a specific image SI11 visually recognized by the user after the target image changes. In FIG. 22, as the target image set next according to the work order, an outside scene image including a target image OI2 of the left hand and a target image OI3 of the right hand of the user wearing the gloves in addition to the target image OI1 is shown. In FIG. 22, the specific image SI11 set to be displayed next to the specific image SI10 according to the work support is shown. The target images OI1, OI2, and OI3 are target images set according to the order of the work support. Therefore, the specific-image control unit 165d displays the specific image SI11. The specific image SI11 is a message image "Checked! Please perform work" indicating that the user may perform work using the electric drill. When the specific image SI11 set according to the order of the work support is displayed, the specific-image control unit 165d ends the specific image changing processing.

When the detected change of the target image is not a change conforming to a work instruction, for example, when the user holds the hands in front of the camera without wearing the gloves in the processing in step S92 in FIG. 21 (step S92: NO), the specific-image control unit 165d displays, as an advice message, a message image "Wrong! Please follow the instruction" for urging the user to follow the work support of the specific image SI10 (FIG. 20) (step S99 in FIG. 21) and ends the specific image changing processing.

When it is determined in the processing in step S91 that a change of the target image is not detected (step S91: NO), the specific-image control unit 165d determines whether the visual line direction of the user changes and the target image OI1, which is a condition for displaying the specific image SI10 (FIG. 20), is included in the outside scene image (step S94 in FIG. 21). When the visual line direction of the user does not greatly change and the target image OI1 is included in the outside scene image (step S94: NO), the specific-image control unit 165d continues to monitor a change of the specific target (step S91).

When it is determined that the target image OI1 is not included in the outside scene image (step S94: YES) or when it is determined in the processing in step S93 that a specific image set next according to the work support is absent (step S93: NO), the specific-image control unit 165d specifies changing speed of the visual line direction (step S96). As in the processing in steps S80 and S81 of the specific image display processing shown in FIG. 18, the specific-image control unit 165d sets, on the basis of the specified changing speed of the visual line direction, a changing period for subjecting the displayed specific image SI10 to fade-out display (step S97 in FIG. 21). Subsequently, the specific-image control unit 165d gradually reduces the luminance of the specific image SI10 in the set changing period and sets an image based on the image data of the specific image SI10 to non-display via the intermediate images.

As explained above, in the head mounted display device 100d in the third embodiment, the image determining unit 168d analyzes the eye picked-up images picked up by the eye image pickup cameras 37 and 38 to specify the size of the pupils of the eyes of the user. When the size of the pupils is smaller than the predetermined threshold, the specific-image control unit 165d displays the intermediate images and the specific image set to luminances lower than the luminances set when the size of the pupils is equal to or larger than the predetermined threshold. Therefore, in the head mounted display device 100d in the third embodiment, when the size of the pupils of the eyes of the user is large, that is, when brightness around the user is low, control for reducing the luminances of the intermediate images and the specific image is performed. When the brightness around the user is high, control for increasing the luminances of the intermediate images and the specific image is performed. Therefore, the luminances of the intermediate images and the specific image are controlled according to the brightness around the user. Consequently, it is possible to reduce the visual burden on the user without causing the user to visually recognize an image at luminance higher than necessary. Further, it is possible to cause the user to visually recognize an image having brightness enough for enabling the user to visually recognize the image.

In the head mounted display device 100d in the third embodiment, the image determining unit 168d specifies positions of the specific target in the frames of the outside scene image to specify relative speed of movement of the specific target in the outside scene image. The specific-image control unit 165d sets the changing period long when the relative speed of the movement of the target image is equal to or higher than the predetermined threshold and sets the changing period short when the relative speed of the movement of the target image is lower than the predetermined threshold. Therefore, in the head mounted display device 100d in the third embodiment, when the relative speed of the movement of the target image is high, time until completion of the fade-in display is set long. Therefore, it is possible to reduce the visual burden on the user by reducing a visual change for the user.

In the head mounted display device 100d in the third embodiment, the specific-image control unit 165d specifies the size of the specific target included in the outside scene image to determine a distance between the user and the specific target. If the determined distance is equal to or larger than a threshold, the specific-image control unit 165d determines that the specific target is included in the outside scene image. If the determined distance is smaller than the threshold, even if the specific target is included in the outside scene image, the specific-image control unit 165d does not detect the specific target and determines that the specific target is not included in the outside scene image. When the target image, which is the image of the specific target, is included in the outside scene image, the specific-image control unit 165d performs the fade-in display of the intermediate images and the specific image. Therefore, in the head mounted display device 100d in the third embodiment, an image of the specific target is picked up and, in addition, only when the distance between the user and the specific target is equal to or smaller than a fixed distance, the intermediate images and the specific image are displayed. Therefore, when the specific target is not present in a position close to the user, the specific image and the like, which are information unnecessary for the user, is not displayed. Therefore, convenience for the user is improved.

In the head mounted display device 100d in the third embodiment, the image data, on which the specific image SI10 is based, is the message for urging the user of the work support application to follow the order of the work. Therefore, the user can perform work, which the user should perform, safely and in a correct procedure. Convenience for the user is improved.

D. Modifications

The invention is not limited to the embodiments explained above. The invention can be carried out in various forms without departing from the spirit of the invention. For example, modifications explained below are also possible.

D1. Modification 1

In the embodiments, the fade-in display and the fade-out display are explained using the heat detection application and the weather application as the examples of the selected application. However, the detection application, the specific image, and the intermediate images can be variously modified.

Figure 23:
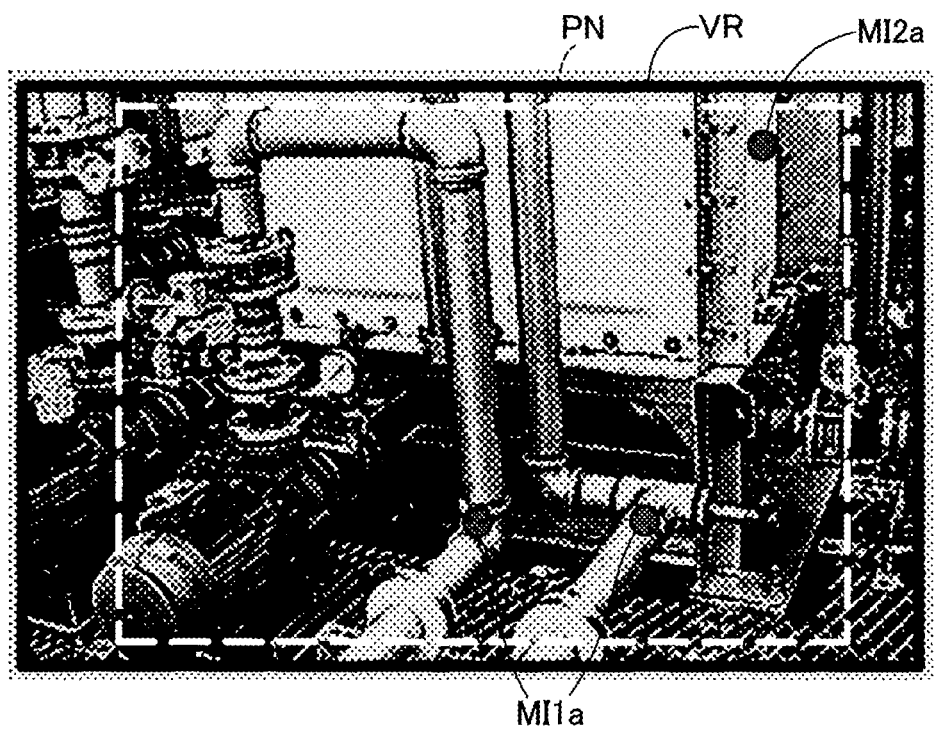
FIG. 23 is an explanatory diagram showing an example of an intermediate image visually recognized by the user.
Figure 24:
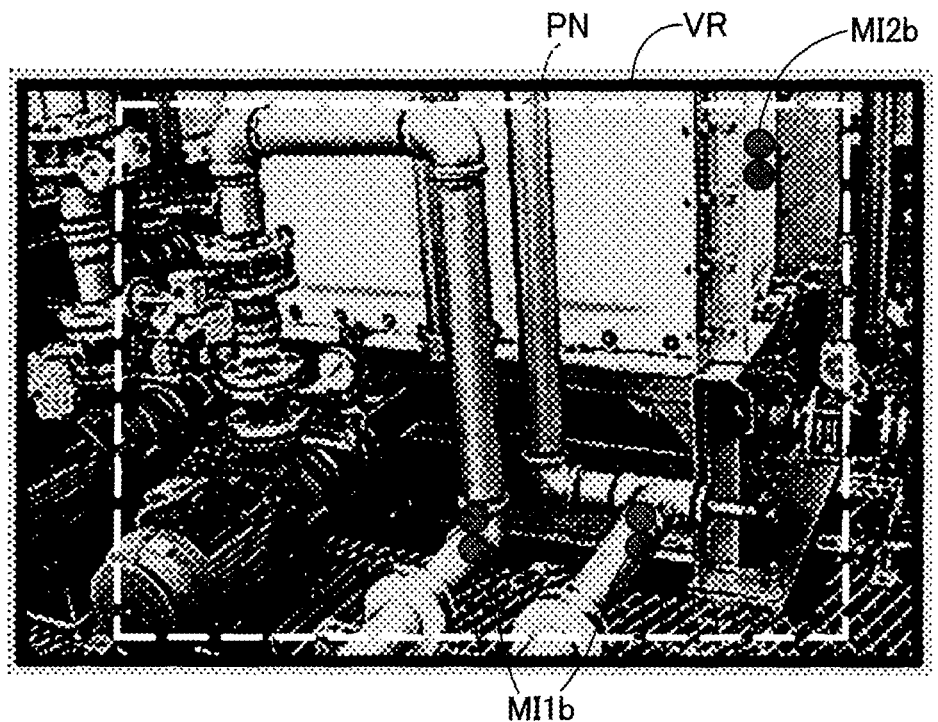
FIG. 24 is an explanatory diagram showing an example of an intermediate image visually recognized by the user.

FIGS. 23 and 24 are explanatory diagrams showing examples of intermediate images visually recognized by the user. In FIGS. 23 and 24, modifications of the intermediate images MI1 and MI2 (FIG. 7) in the first embodiment are shown. In FIGS. 23 and 24, intermediate images MI1a, MI2a, MI1b, and MI2b included in regions of the specific images SI1 and SI2 finally displayed on the image display unit 20 by the fade-in display are shown. In this modification, in the fade-in display, unlike the first embodiment, luminances are not gradually changed. After a plurality of intermediate images generated on the basis of different image data are displayed, the specific images SI1 and SI3 are displayed. The specific-image control unit 165 creates a plurality of intermediate image data indicating a part of specific image data and causes the user to visually recognize the intermediate image MI1a (FIG. 23), the intermediate image MI1b (FIG. 24), and the specific image SI1 (FIG. 6), which are generated on the basis of the intermediate image data, in this order. Therefore, in this modification, the user is not caused to suddenly visually recognize the specific images SI1 and SI2 in a state in which only an outside view is visually recognized. A region of an image that the user is caused to visually recognize is increased according to elapse of time. Therefore, since changes in the outside scene and the image visually recognized by the use are gentle, the burden on the visual sense of the user is reduced. The fade-in display may be performed according to a combination of a change in luminance and a change in a display region.

Figure 25:
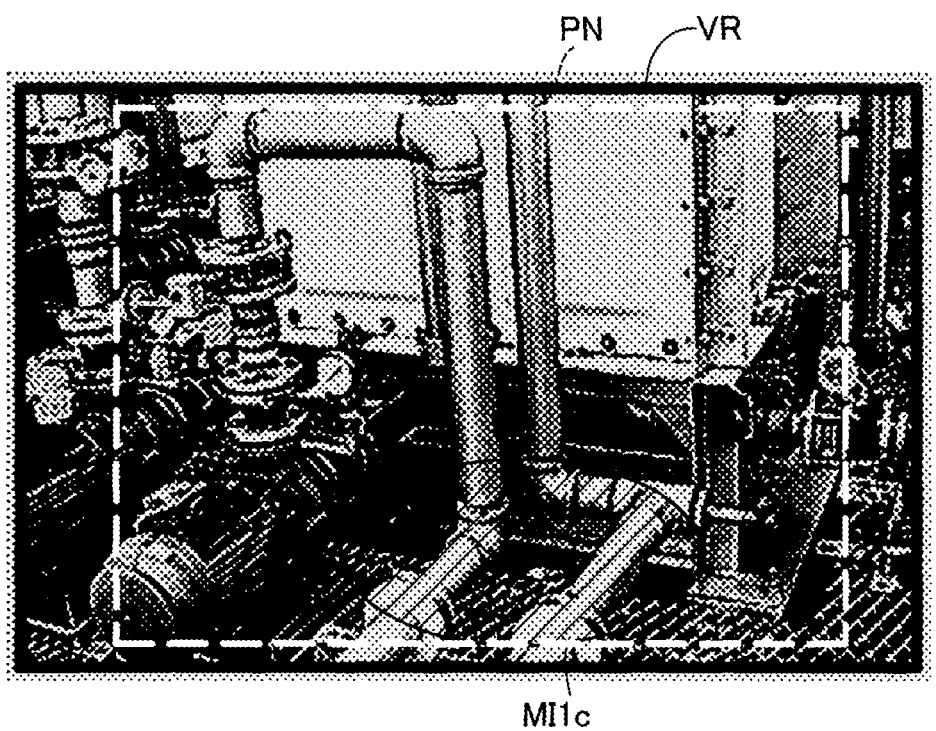
FIG. 25 is an explanatory diagram showing an example of an intermediate image visually recognized by the user.
Figure 26:
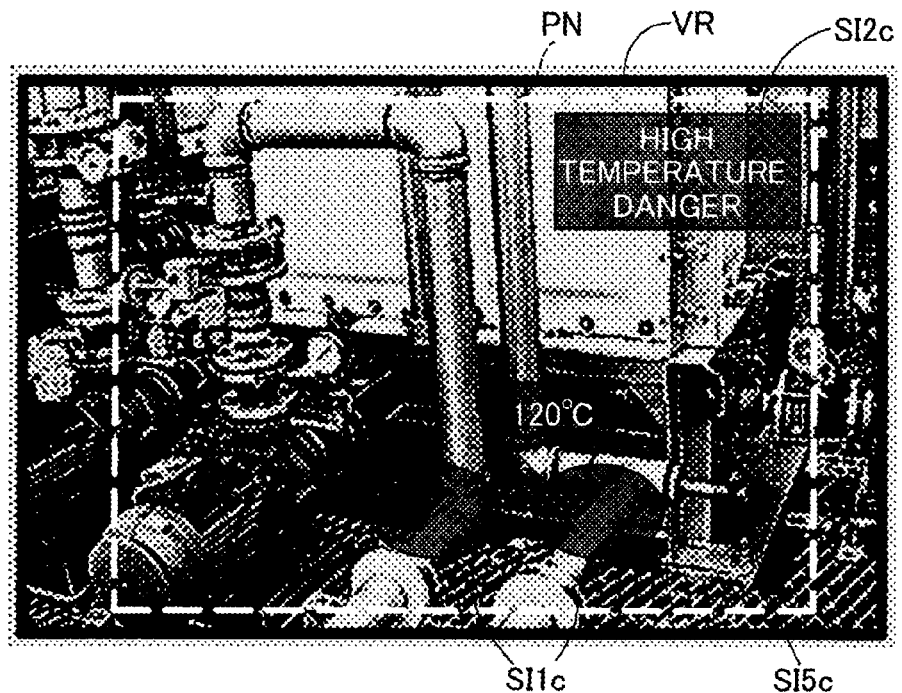
FIG. 26 is an explanatory diagram showing an example of a specific image visually recognized by the user.

FIG. 25 is an explanatory diagram showing an example of an intermediate image MI1c visually recognized by the user. FIG. 26 is an explanatory diagram showing an example of specific images SI1c, SI2c, and SI5c visually recognized by the user. In this modification, as in the first embodiment, the fade-in display is performed by gradually increasing luminances. At the same time, an image display region is reduced from the intermediate image MI1c to the specific image SI1c. In this way, the intermediate image may be a region larger than the specific image.

D2. Modification 2

Figure 27:
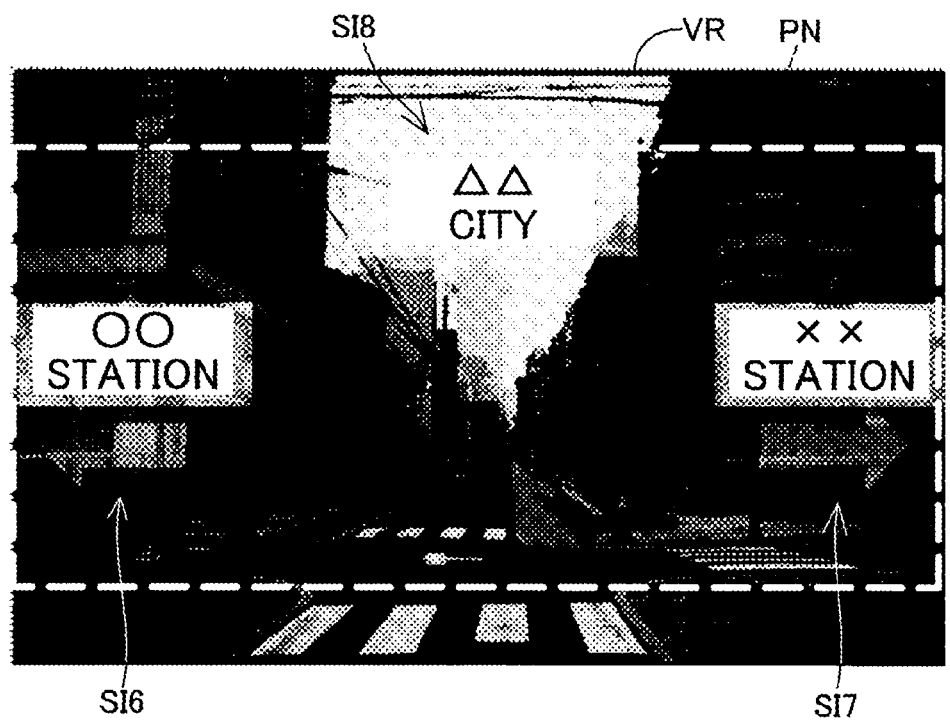
FIG. 27 is an explanatory diagram showing an example of a specific image visually recognized by the user.

FIG. 27 is an explanatory diagram showing an example of specific images SI6, SI7, and SI8 visually recognized by the user. In FIG. 27, the visual field VR visually recognized by the user when "route guidance" is selected as the detection application is shown. In this modification, the GPS module 134 specifies the present position of the user. When the specified position is an intersection, the specific-image control unit 165 causes the image display unit 20 to display the specific images SI6, SI7, and SI8 in the route guidance.

Figure 28:
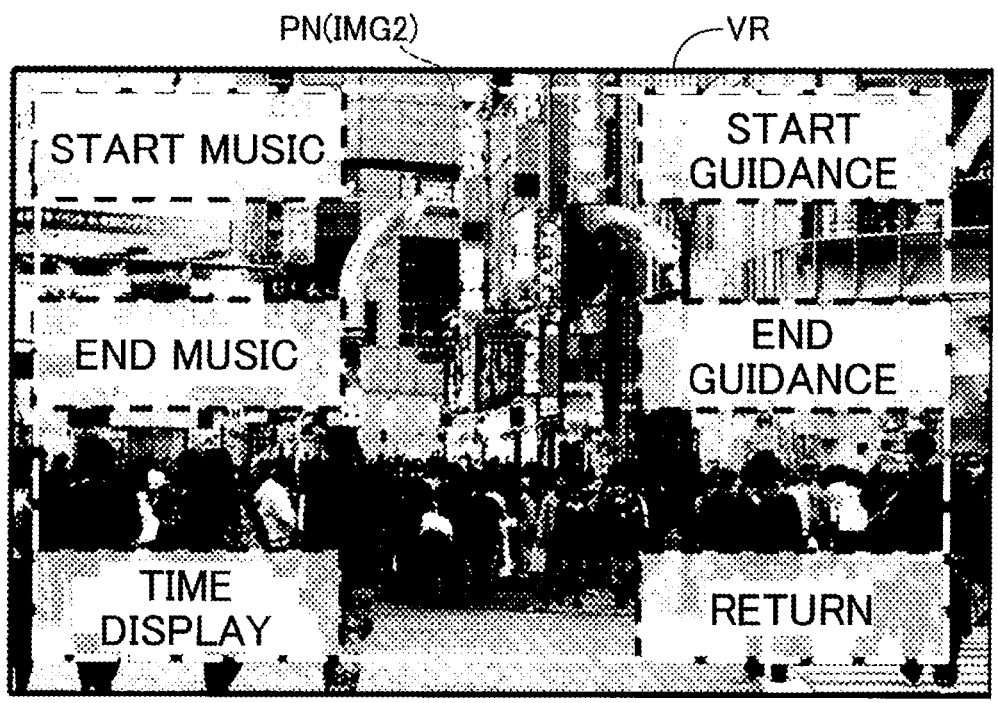
FIG. 28 is an explanatory diagram showing an example of a menu image including a specific image visually recognized by the user.

FIG. 28 is an explanatory diagram showing an example of a menu image IMG2 including specific images visually recognized by the user. In FIG. 28, the visual fields VR visually recognized by the user when "standby menu display" is selected as the detection application is shown. In this modification, when the GPS module 134 specifies the present position of the user and the user does not move from the specified present position for a fixed time, the specific-image control unit 165 causes the image display unit 20 to display a menu screen for "music start" and the like.

Figure 29:
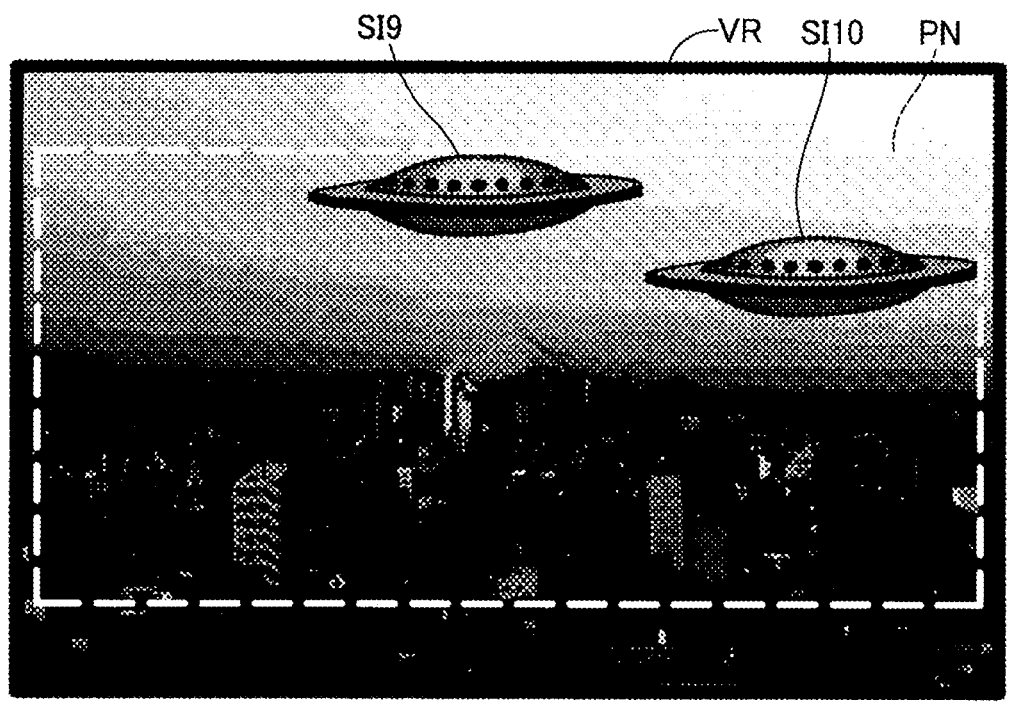
FIG. 29 is an explanatory diagram showing an example of a specific image visually recognized by the user.

FIG. 29 is an explanatory diagram showing an example of specific images SI9 and SI10 visually recognized by the user. In FIG. 29, the visual field VR visually recognized by the user when "standby screen display" is selected as the detection application is shown. In this modification, the image determining unit 168 recognizes "sky", which is a specific target image, in an outside scene image. At the same time, the GPS module 134 specifies the present position of the user. When the user does not move from the specified present position for a fixed time, the specific-image control unit 165 causes the image display unit 20 to display the specific images SI9 and SI10.

D3. Modification 3

In the first embodiment, in the fade-in display and the fade-out display, the period TE for changing luminances in displaying the intermediate images MI1 and MI2 is the same. However, the period TE may be different. For example, in the fade-in display, the period TE may be long compared with the fade-out display. In the first embodiment, when the intermediate images MI1 and MI2 are displayed, an increase ratio of luminances is controlled to be large according to elapse of time. However, the increase ratio of luminances is not limited to this and can be variously changed. For example, the increase ratio of luminances may be fixed with respect to the elapse of time or may change stepwise with respect to the elapse of time.

In the embodiment, as shown in FIGS. 8 and 10, the specific-image control unit 165 increases and reduces the luminances between 0% and 100%. However, an upper limit value and a lower limit value of the luminances are not limited to this and can be variously modified. For example, the specific-image control unit 165 may increase and reduce the luminances between 20% and 90%.

In the first embodiment, the fade-in display and the fade-out display are performed. However, a method of displaying the intermediate images MI1 and MI2 and the specific images SI1 and SI2 is not limited to this and can be variously modified. For example, it is also possible that, while the images are blinked at certain two luminances, in the image display largest region PN, the regions of the intermediate images gradually increase and change to the regions of the specific images. It is also possible that the fade-in display and the fade-out display are performed by increasing and reducing the luminances while blinking the images.

In the embodiment, one specific image is finally displayed on the basis of the detection condition. However, the specific image can be variously modified. For example, a plurality of specific images may be identified and displayed on the basis of the detection condition. In the first embodiment, a color of the specific image may be different not only according to the determination whether detected temperature is equal to or higher than the threshold but also according to the detected temperature is equal to or higher than which of a plurality of set threshold temperatures. When the detected temperature is high temperature, a specific image having a larger R component among RGB components may be displayed. It is possible to attract the attention of the user concerning a region having higher temperature by forming an outer frame of the displayed specific image as a jagged shape rather than a circle.

In the embodiment, the selection menu screen IMG1 (FIG. 5) of the detection application is explained as an example. However, the selection menu screen IMG1 of the detection application is not limited to this and can be variously changed. For example, an end button for ending an application may be included in the selection menu screen IMG1. Selection buttons for content reproduction and the like different from the selection buttons of the detection application may be included.

D4. Modification 4

In the third embodiment, the changing period until the completion of the display of the specific image in the fade-in display is set according to the relative speed of the movement of the target image in the outside scene image. However, a method of setting the changing period is not limited to this and can be variously modified. For example, the changing period may be set according to the specified size of the pupils of the user. The specific-image control unit 165d sets the changing period longer as the specified size of the pupils of the eyes of the user is larger. In this modification, when the size of the pupils of the eyes of the user is large, that is, when the brightness around the user is low, the changing period until the completion of the fade-in display is set to be long. Therefore, when the user is caused to visually recognize the intermediate images and the specific image, it is possible to prevent the visual burden on the user from increasing.

In the third embodiment, the changing period until the completion of the fade-in display is set according to the comparison of the relative speed of the movement of the target image and the predetermined threshold. However, control other than the setting of the changing period may be performed according to the relative speed of the movement of the target image. For example, when the relative speed of the movement of the target image is equal to or higher than the threshold, as in the second embodiment, intermediate images based on image data different from the image data, on which the specific image is based, may be displayed. The intermediate images in this modification may be, for example, only an image other than the message in the specific image SI10 (FIG. 20). The image other than the message in the specific image SI10 in this modification is equivalent to a pre-display image in the appended claims. In this modification, even when the target image is included in the outside scene image, when the relative speed of the movement of the target image is large, the intermediate images are displayed in a preparation stage before the specific image is displayed. Consequently, it is possible to reduce a change in the outside scene visually recognized by the user and reduce the visual burden on the user.

In the third embodiment, the changing period in the fade-in display is set according to the relative speed of the movement of the target image included in the outside scene image. However, the setting of the changing period is not limited to this and can be variously modified. For example, the 9-axis sensor 66 of the image display unit 20 may specify the speed of the movement of the user by estimating a movement of the entire body of the user in addition to the movement of the head of the user. When the speed of the movement of the user is high, in some case, a change per short time of the visual field VR visually recognized by the user is large. Therefore, in this modification, when the speed of the movement of the user is high, the specific-image control unit 165d sets the changing period in the fade-in display long. Consequently, when the movement of the user is fast, a ratio of a change of the intermediate images visually recognized by the user decreases. Therefore, it is possible to reduce the visual burden on the user.

When the speed of the movement of the user or the relative speed of the movement of the target image included in the outside scene image is high, it is possible to attract some attention of the user by outputting sound via the earphones 32 and 34 in addition to increasing the changing period in the fade-in display. When the speed of the movement of the user or the relative speed of the movement of the target image is high, in some case, it is difficult to cause the user to visually recognize the specific image. In that case, in this modification, a specific image scheduled to be displayed is notified to the user by the sound output. Therefore, convenience for the user is improved.

The specific-image control unit 165d may set, on the basis of content of the specific image, the relative speed of the movement of the target image included in the outside scene image, the speed of the movement of the user, and the like, positions where the intermediate images and the specific image are displayed. For example, when the specific image is a message image for attract emergency attention of the user, the specific-image control unit 165d displays the specific image in the center of the image display largest region PN and sets the changing period of the fade-in display short. Consequently, the user can quickly visually recognize the specific image. Convenience for the user is further improved. Even if the specific image attracts emergency attention of the user, for example, when the image is already displayed within 5 minutes, the specific-image control unit 165d displays the specific image in a position other than the center of the image display largest region PN to change the display position of already-informed content and cause the user to visually recognize a wider outside scene. Consequently, convenience for the user is further improved.

In the embodiment, when the visual direction of the user is fixed, the position where the specific image is displayed is specified. However, when the visual direction of the user changes in a predetermined range without being fixed, the visual line direction may be assumed to be fixed. For example, even when the visual line direction of the user fluctuates in a range of a threshold set in advance, it is determined that the visual line direction is fixed. Consequently, the intermediate images and the specific image are easily displayed. Convenience for the user is improved.

In the third embodiment, the setting of the luminances and the setting of the changing period in the fade-in display are performed. However, the setting of the luminances and the setting of the changing period may be used not only in the fade-in display but also in the fade-out display. When the setting of the luminances and the setting of the changing period are used in the fade-out display, for example, even when the target image is not included in the outside scene image, the specific image does not instantaneously change to non-display. The specific image gradually changes to non-display through the intermediate images. Therefore, it is possible to reduce the visual burden on the user.

In the specific image changing processing in the third embodiment, when the specific image SI11 (FIG. 22) set next to the specific image SI10 (FIG. 20) according to the order of the work support is present, the fade-in display and the fade-out display are not performed and the specific image SI11 is displayed. However, the fade-in display and the fade-out display may be performed when the specific image is changed. For example, in the specific image changing processing in the third embodiment, the specific image SI11 may be subjected to the fade-in display after the specific image SI10 is subjected to the fade-out display. It is also possible that positions where the specific image SI10 and the specific image SI11 are displayed are different on the image display largest region PN and the fade-out display of the specific image SI10 and the fade-in display of the specific image SI11 are simultaneously performed or the fade-out display or the fade-in display may be applied to only one of the specific images.

In the third embodiment, the size of the pupils of the eyes of the user is specified by the binarization of the eye picked-up images picked up by the eye image pickup cameras 37 and 38. However, a method of specifying the size of the pupils is not limited to this and can be variously modified. For example, an emitting section and a receiving section for an infrared ray formed in the image display unit 20d may specify the size of the pupils. In this modification, the emitting section for the infrared ray emits the infrared ray to the eyes of the user and the receiving section for the infrared ray receives reflected light. The whites of the eyes and the irises of the eyes have different reflectances of the infrared ray. Therefore, the size of the pupils can be specified using the reflected light received by the light receiving section.

The changing period and the luminances in the fade-in display and the fade-out display may be individually set by operating the operation unit 135. A predetermined changing period and predetermined luminances may be set according to a set age.

In the embodiment, the specific-image control unit 165 adjusts the light amount of the backlights 221 and 222 to thereby adjust the luminances of the plurality of intermediate images and the specific image to be different. However, a method of changing the luminances is not limited to this and can be variously modified. For example, the backlight control unit 201, the right LCD control unit 211, the right backlight 221, and the right LCD 241 equivalent to the image-light generating unit in the embodiment may be configured by an organic EL (Electro-Luminescence) display and an organic EL control unit. In this modification, the luminances change when a light amount of emitted light of the display itself is controlled without using the backlights 221 and 222. The organic El display and the organic EL control unit in this modification are equivalent to an image modulating element in the appended claims.

D5. Modification 5

In the embodiments, the operation unit 135 is formed in the control unit 10. However, a form of the operation unit 135 can be variously modified. For example, a user interface functioning as the operation unit 135 may be provided separately from the control unit 10. In this case, since the operation unit 135 is separate from the control unit 10 on which the power supply 130 and the like are formed, the operation unit 135 can be reduced in size and operability for the user is improved. When a 9-axis sensor for detecting movement of the operation unit 135 is formed in the operation unit 135 and various kinds of operation are performed on the basis of the detected movement, the user can sensuously operate the head mounted display device 100.

For example, the image-light generating unit may include an organic EL display and an organic EL control unit. For example, in the image-light generating unit, LCOS (Liquid crystal on silicon; LCoS is a registered trademark), a digital micro mirror device, or the like can be used instead of the LCD. For example, the invention can also be applied to a head mounted display of a laser retinal projection type. In the case of the laser retinal projection type, a "region where image light can be emitted in the image-light generating unit" can be defined as an image region recognized by the eyes of the user.

For example, the head mounted display may be a head mounted display in which the optical-image display unit covers only a part of the eyes of the user, in other words, the optical-image display unit does not completely cover the eyes of the user. The head mounted display may be a head mounted display of a so-called monocular type.

Figure 30A:
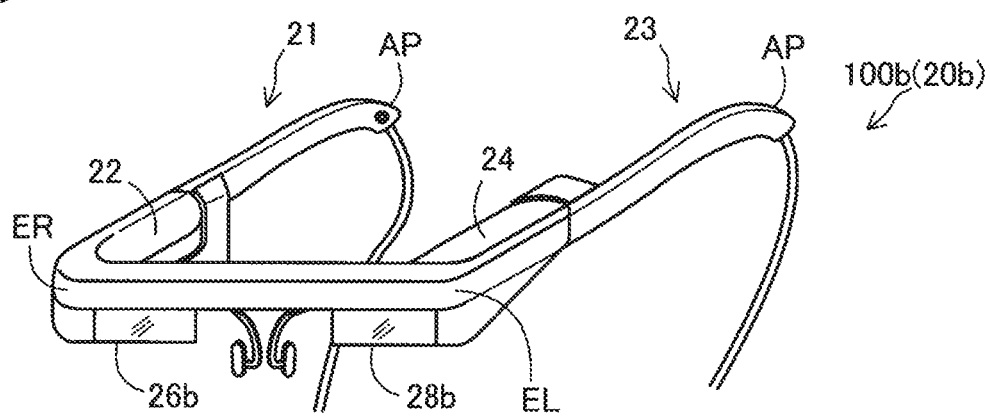
FIGS. 30A and 30B are explanatory diagrams showing the external configurations of head mounted display devices in modifications.
Figure 30B:
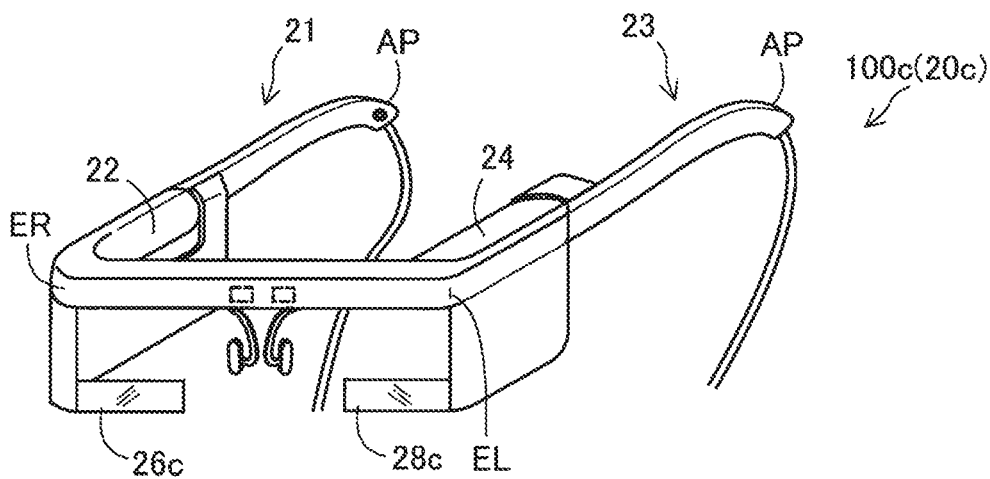

FIGS. 30A and 30B are explanatory diagrams showing the external configuration of the head mounted display device 100b in the modification. In an example shown in FIG. 30A, a head mounted display device 100b in the modification is different from the head mounted display device 100 shown in FIG. 1 in that an image display unit 20b includes a right optical-image display unit 26b instead of the right optical-image display unit 26 and includes a left optical-image display unit 28b instead of the left optical-image display unit 28. The right optical-image display unit 26b is formed smaller than the optical member in the embodiments and is arranged obliquely above the right eye of the user during mounting of the head mounted display device 100b. Similarly, the left optical-image display unit 28b is formed smaller than the optical member in the embodiments and is arranged obliquely above the left eye of the user during mounting of the head mounted display device 100b. In an example shown in FIG. 30B, the head mounted display device 100b in the modification is different from the head mounted display device 100 shown in FIG. 1 in that an image display unit 20c includes a right optical-image display unit 26c instead of the right optical image display 26 and includes a left optical-image display unit 28c instead of the left optical-image display unit 28. The right optical-image display unit 26c is formed smaller than the optical member in the embodiments and is arranged obliquely below the right eye of the user during mounting of the head mounted display. The left optical-image display unit 28c is formed smaller than the optical member in the embodiments and is arranged obliquely below the left eye of the user during mounting of the head mounted display. In this way, the optical-image display unit only has to be arranged near the eyes of the user. The size of the optical members formed in the optical-image display unit is also arbitrary. The head mounted display device 100 can be realized in which the optical-image display unit covers only a part of the eyes of the user, in other words, the optical-image display unit does not completely cover the eyes of the user.

As the earphones, an ear hook type or a headband type may be adopted. The earphones may be omitted. For example, the image display unit may be configured as a head mounted display mounted on vehicles such as an automobile and an airplane. For example, the image display unit may be configured as a head mounted display incorporated in body protective equipment such as a helmet.

The configuration of the head mounted display device 100 in the embodiments is only an example and can be variously modified. For example, one of the direction key 16 and the track pad 14 provided in the control unit 10 may be omitted. Another operation interface such as an operation stick may be provided in addition to or instead of the direction key 16 and the track pad 14. Input devices such as a keyboard and a mouse can be connected to the control unit 10. The control unit 10 may receive inputs from the keyboard and the mouse.

As the image display unit, for example, an image display unit of another shape such as an image display unit worn like a cap may be adopted instead of the image display unit 20 worn like eyeglasses. The earphones 32 and 34 can be omitted as appropriate.

In the embodiments, the head mounted display device 100 may guide image light representing the same image to the left and right eyes of the user and cause the user to visually recognize a two-dimensional image or may guide image light representing different images to the left and right eyes of the user and cause the user to visually recognize a three-dimensional image.

In the embodiments, apart of the components realized by hardware may be replaced with software. Conversely, apart of the components realized by software may be replaced with hardware. For example, in the embodiments, the image processing unit 160 and the sound processing unit 170 are realized by the CPU 140 reading out and executing a computer program. However, these functional units may be realized by a hardware circuit.

When a part or all of the functions of the invention are realized by software, the software (a computer program) can be provided while being stored in a computer-readable recording medium. In the invention, the "computer-readable recording medium" is not limited to portable recording media such as a flexible disk and a CD-ROM and includes various internal storage devices in the computer such as a RAM and a ROM and external storage devices fixed to the computer such as a hard disk.

In the embodiments, as shown in FIGS. 1 and 2, the control unit 10 and the image display unit 20 are formed as separate components. However, the configuration of the control unit 10 and the image display unit 20 is not limited to this and can be variously modified. For example, all the components formed in the control unit 10 may be formed on the inside of the image display unit 20 or a part of the components may be formed. The power supply 130 in the embodiment may be independently formed and can be replaced. The components formed in the control unit 10 may be redundantly formed in the image forming unit 20. For example, the CPU 140 shown in FIG. 2 may be formed in both of the control unit 10 and the image display unit 20. Functions performed by the CPU 140 formed in the control unit 10 and a CPU formed in the image display unit 20 may be separated.

In the embodiments, the specific-image control unit 165 creates specific image data and transmits a control signal for the specific image data to the image processing unit 160 and the display control unit 190 to control the intermediate images and the like. However, the specific-image control unit 165 does not always need to control the intermediate images and the like. The entity of the control can be variously changed. For example, instead of the specific-image control unit 165, the image processing unit 160 and the display control unit 190 may create the specific image data. The backlight control units 201 and 202 of the image display unit 20 may adjust luminance to change image light generated on the basis of the specific image data.

The control unit 10 and the image display unit 20 may be integrated to configure a wearable computer attached to clothes of the user.

The invention is not limited to the embodiments and the modifications explained above and can be realized in various configurations without departing from the spirit of the invention. For example, the technical features in the embodiments and the modifications corresponding to the technical features in the aspects described in the summary can be replaced or combined as appropriate in order to solve a part or all of the problems or in order to attain a part or all of the effects. Unless the technical features are explained in this specification as essential technical features, the technical features can be deleted as appropriate.

What is claimed is:

1. A control method for a transmission type head mounted display device including an image display unit including an image-light generating unit configured to generate image light on the basis of image data and emit the image light, the image display unit allowing a user to visually recognize the image light as a virtual image and transmitting an outside scene in a state in which the image display unit is worn on a head of the user, the control method comprising:

setting, on the basis of specific information and as the image light that the user is allowed to visually recognize using the image display unit, specific image light generated on the basis of set specific image data and changing according to elapse of time, the specific image light including a plurality of kinds of first image light and second image light different from the plurality of kinds of first image light, and each of the plurality of kinds of first image light and the second image light having different luminances;

specifying a size of pupils of the user;

changing the image light that the user is allowed to visually recognize using the image display unit from the plurality of kinds of first image light to the second image light according to the elapse of time; and performing at least one of:

setting luminances of each of the plurality of kinds of first image light and the second image light such that luminance at a time when a specified size of pupils of the user is a second size larger than a first size is smaller than luminance at a time when the specified size of the pupils is the first size, and setting time for changing the plurality of kinds of first image light to the second image light longer as the specified size of the pupils is larger when the control unit changes a state in which the specific image light is allowed to be visually recognized by the user to a state in which the specific image light is allowed to be visually recognized by the user.

2. A control method for a transmission type head mounted display device including an image display unit including an image-light generating unit configured to generate image light on the basis of image data and emit the image light, the image display unit allowing a user to visually recognize the image light as a virtual image and transmitting an outside scene in a state in which the image display unit is worn on a head of the user, the control method comprising:

picking up an image of the outside scene in a visual line direction of the user;

extracting a specific target included in the picked-up image;

specifying a speed of a movement of the specific target in an image pickup range;

setting, on the basis of specific information and as the image light that the user is allowed to visually recognize using the image display unit, specific image light generated on the basis of set specific image data and changing according to elapse of time, the specific image light including a plurality of kinds of first image light and second image light different from the plurality of kinds of first image light, and the specific information comprising information concerning the extracted specific target;

changing the image light that the user is allowed to visually recognize using the image display unit from the plurality of kinds of first image light to the second image light according to the elapse of time; and performing at least one of:

setting time for changing the plurality of kinds of first image light to the second image light longer as the specified speed of the movement of the specific target is higher, and when the specified speed of the specific target is equal to or higher than a set first threshold, setting, as the image light, pre-display image light generated on the basis of image data different from the specific image light before setting the specific image light.

3. The control method according to claim 2, further comprising detecting a temperature distribution of the outside scene in a visual line direction of the user, wherein the specific information further comprises information for specifying the detected temperature distribution of the outside scene.

4. The control method according to claim 2, further comprising specifying a distance between the specific target and the image display unit; and setting the specific image light when the specified distance is equal to or smaller than a set second threshold.

5. The control method according to claim 4, wherein the specific information further comprises information concerning an operation that the user should perform for the specific target.

6. The control method according to claim 2, further comprising acquiring position information for specifying a position of the user, wherein the specific information further comprises the acquired position information.

7. The control method according to claim 2, further comprising acquiring visual line direction information, which is information for specifying a visual line direction of the user, wherein the specific information further comprises the visual line direction information.

8. A control method for a transmission type head mounted display device including an image display unit including an image-light generating unit configured to generate image light on the basis of image data and emit the image light, the image display unit allowing a user to visually recognize the image light as a virtual image and transmitting an outside scene in a state in which the image display unit is worn on a head of the user, the control method comprising:

setting, on the basis of specific information and as the image light that the user is allowed to visually recognize using the image display unit, specific image light generated on the basis of set specific image data and changing according to elapse of time, the specific image light including a plurality of kinds of first image light and second image light different from the plurality of kinds of first image light;

specifying a speed of a movement of the user;

changing the image light that the user is allowed to visually recognize using the image display unit from the plurality of kinds of first image light to the second image light according to the elapse of time; and setting time for changing the plurality of kinds of first image light to the second image light longer as the specified speed of the movement of the user is higher.

* * * * *